(12) United States Patent
Fujita et al.

(10) Patent No.: US 6,819,864 B2
(45) Date of Patent: Nov. 16, 2004

(54) MULTI CONTROLLER

(75) Inventors: Kazuya Fujita, Kawasaki (JP); Shojiro Sato, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 641 days.

(21) Appl. No.: 09/803,140

(22) Filed: Mar. 12, 2001

(65) Prior Publication Data

US 2002/0039485 A1 Apr. 4, 2002

(30) Foreign Application Priority Data

Oct. 2, 2000 (JP) .......................................... 2000-302663

(51) Int. Cl.[7] .............................................. H04N 5/91
(52) U.S. Cl. .......................... 386/46; 348/734; 386/125; 386/126
(58) Field of Search ........................... 348/734; 386/46, 386/83, 95, 125, 126; H04N 5/91

(56) References Cited

U.S. PATENT DOCUMENTS

| | | | | |
|---|---|---|---|---|
| 5,047,867 A | * | 9/1991 | Strubbe et al. ............... | 386/83 |
| 5,367,316 A | * | 11/1994 | Ikezaki ........................ | 348/734 |
| 5,517,257 A | * | 5/1996 | Dunn et al. .................. | 348/734 |
| 5,652,630 A | * | 7/1997 | Bertram et al. .............. | 348/734 |
| 5,724,106 A | * | 3/1998 | Autry et al. .................. | 348/734 |
| 6,016,139 A | * | 1/2000 | Terasawa et al. ............ | 345/169 |
| 6,075,575 A | * | 6/2000 | Schein et al. ................ | 348/734 |

FOREIGN PATENT DOCUMENTS

JP          10-199124          7/1998

* cited by examiner

Primary Examiner—Vincent Boccio
Assistant Examiner—James A Fletcher
(74) Attorney, Agent, or Firm—Pillsbury Winthrop LLP

(57) ABSTRACT

A multi controller according to the present invention comprise first operating means for generating a control signal in association with a declination operation in plural directions, second operating means for generating a control signal in association with a rotation operation in a circular arc, and third operating means for generating a control signal in association with a shifting operation in front and back. Depending on the mode which is being executed, the control signal generated by the same operating means controls various operations.

20 Claims, 17 Drawing Sheets

| | |
|---|---|
| CURSOR KEY | FOCUS SHIFTING IN RESERVATION DATA LIST |
| DIAL KEY | SELECT ITEM VALUE OF SET ITEMS (WHEN IT IS ROTATED CYCLICALLY, RIGHT-HANDED AND LEFT-HANDED, ITEM VALUES APPEAR IN REVERSE)<br>① CH (1 TO 12, 13, 62, C13 TO C63, BS1 TO BS15, L1 TO L4)<br>② DAY (SIXTY TWO DAYS FROM DATA WHEN RECORDING NAVIGATION IS ACTIVATED (THEY ARE DYNAMICALLY CREATED), EVERY SUNDAY TO EVERY SATURDAY, MONDAY TO FRIDAY, MONDAY TO SATURDAY, EVERYDAY)<br>③ TIME (INPUT WITH DIVIDING NUMERAL VALUES SUCH AS AM00 TO 11, PM00 TO 11, "AM" "PM")<br>④ MINUTE (00 TO 59)<br>⑤ RECORDING IMAGE QUALITY (SELECTION IS LIMITED DEPENDING ON SP/LP/JUST/MANUAL, SOUND QUALITY AND MEDIUM)<br>⑥ RECORDING RATE (USER CAN SET ONLY WHEN MODE IS MN. DEFAULT DISPLAY VALUE (DEFAULT VALUE) COMPRISES VALUE SET BY GUI-MN BIT RATE IN DEFAULT. THEY ARE CAPABLE OF BEING CHANGED FROM 2.0 TO 9.8/9.6/8.4, EVERY FOR 0.2. IN SP/LP, ASSOCIATED RATE IS ONLY DISPLAYED. IN JUST, IT IS NOT DISPLAYED.)<br>⑦ SOUND QUALITY (DD-1/DD-2/L-PCM)<br>⑧ MEDIUM (HDD/DVD/SDVD (RECORDING A AND B SIDES)<br>⑨ TS (CHASING REPRODUCTION ON/OFF, WHEN MEDIUM IS HDD, ALWAYS ON, 2DVD IS ALWAYS OFF AND DEFAULT VALUE OF DVD IS OFF.) |
| LEVER KEY | CHANGING OVER OF RESERVATION LIST |
| CURSOR KEY | IN NORMAL MODE: SHIFT TO INPUT MODE<br>IN INPUT MODE: ONE REGISTER RESERVATION DATA. IF DATA IS NOT COMPLETE, DISPLAY MESSAGE. SHIFT TO NORMAL MODE |

FIG. 10

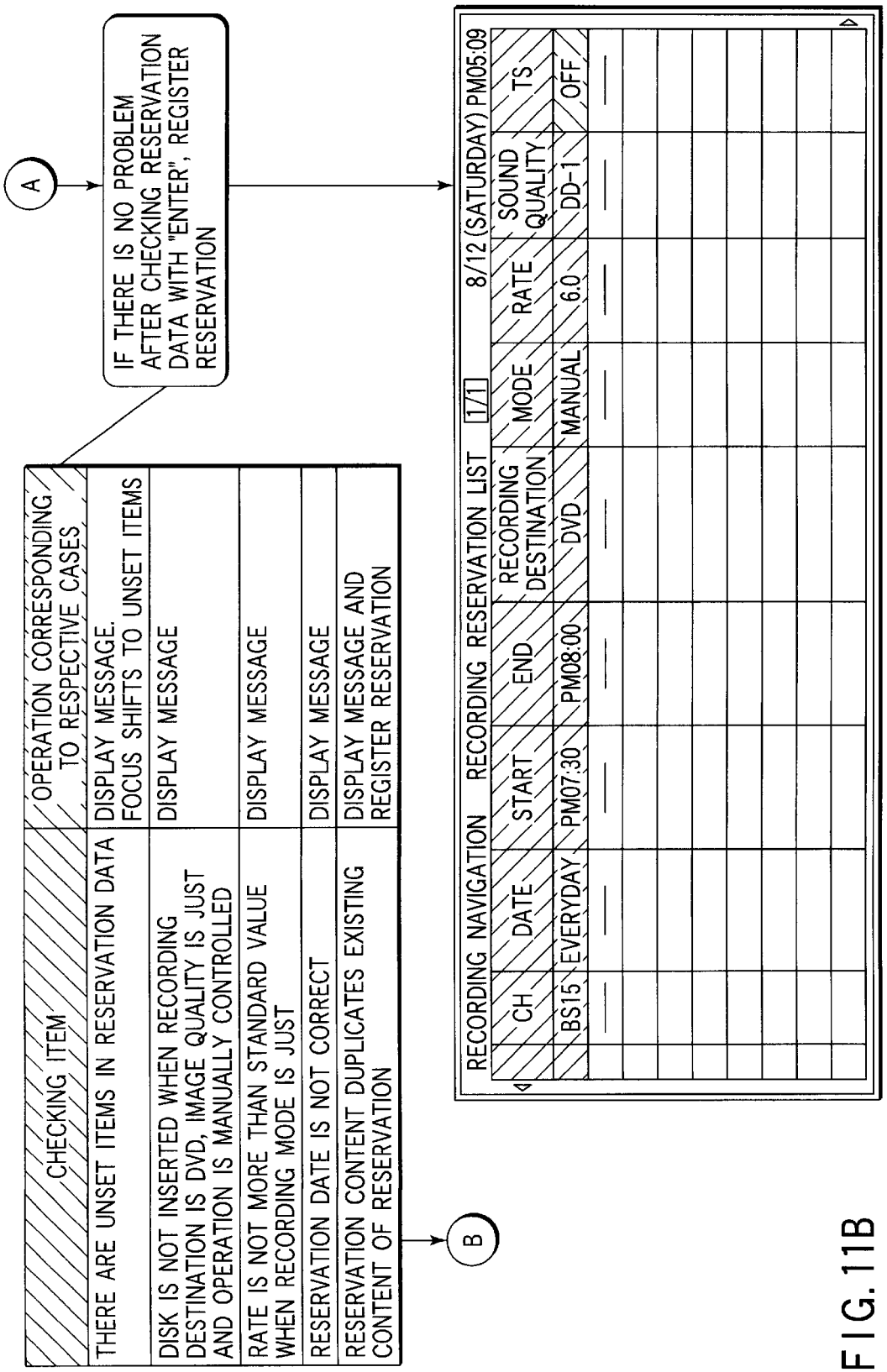
F I G. 11B

RECORDING NAVIGATION    RECORDING RESERVATION LIST    1/1    8/12 (SATURDAY) PM05:09

| CH | DATE | START | END | RECORDING DESTINATION | MODE | RATE | SOUND QUALITY | TS |
|---|---|---|---|---|---|---|---|---|
| BS15 | EVERYDAY | PM07:30 | PM08:00 | DVD | MANUAL | 6.0 | DD-1 | OFF |
| 10 | 04/18 | PM07:00 | PM09:30 | HDD | SP | 5.0 | DD-1 | ON |
| 8 | 04/19 | PM07:00 | PM09:30 | HDD | SP | 5.0 | DD-1 | ON |
| 6 | 04/20 | PM07:00 | PM09:30 | HDD | SP | 5.0 | DD-1 | ON |
| 1 | EVERYDAY | AM08:15 | AM08:30 | DVD | LP | 2.4 | DD-1 | OFF |
| 12 | 04/10 | AM10:30 | AM11:30 | DVD | JUST | 5.6 | L-PCM | OFF |
| 3 | MONDAY TO SATURDAY | AM10:00 | AM00:30 | HDD | LP | 2.4 | DD-1 | ON |
|  |  |  |  |  |  |  |  |  |

RECORDING NAVIGATION    RECORDING RESERVATION LIST    1/1    8/12 (SATURDAY) PM05:09

| CH | DATE | START | END | RECORDING DESTINATION | MODE | RATE | SOUND QUALITY | TS |
|---|---|---|---|---|---|---|---|---|
| BS15 | EVERYDAY | PM07:30 | PM08:00 | DVD | MANUAL | 6.0 | DD-1 | OFF |
| 10 | 04/18 | PM07:00 | PM09:30 | HDD | SP | 5.0 | DD-1 | ON |
| 8 | 04/19 | PM07:00 | PM09:30 | HDD | SP | 5.0 | DD-1 | ON |
| 6 | 04/20 | PM07:00 | PM09:30 | HDD | SP | 5.0 | DD-1 | ON |
| 1 | EVERYDAY | AM08:15 | AM08:30 | DVD | LP | 2.4 | DD-1 | OFF |
| 12 | 04/10 | AM10:30 | AM11:30 | HDD | JUST | 5.6 | L-PCM | OFF |
| 3 | MONDAY TO SATURDAY | AM10:00 | AM00:30 | HDD | LP | 2.4 | DD-1 | ON |
|  |  |  |  |  |  |  |  |  |

MODIFICATION OF RESERVATION

SELECT LINES WITH KEYS OF "↑", "↓", START EDIT WITH "ENTER" AND LOCK LINES. SELECT MODIFICATION ITEMS WITH KEYS OF "←", "→". SET VALUES WITH JOG DIAL KEY. ITEMS IN SAME LINE ARE CAPABLE OF BEING FREELY MODIFIED. AFTER CHECKING, REGISTER MODIFICATION WITH "ENTER".

FIG. 11C

| CURSOR KEY UPPER AND LOWER [↑] [↓] | FOCUS SHIFTING BETWEEN CURRENT POSITION, SPLIT BUTTON AND THUMBNAIL LIST (CYCLIC FOCUS SHIFTING) |
|---|---|
| CURSOR KEY RIGHT AND LEFT [←] [→] | CHAPTER SELECTION BY FOCUS SHIFTING BETWEEN DISPLAYED THUMBNAILS IS CONTROLLED. WITH KEY OF "←", ON LEFT THUMBNAIL, PREVIOUS PAGE IS DISPLAYED AND WITH KEY OF "→", ON RIGHT THUMBNAIL, NEXT PAGE IS DISPLAYED |
| DIAL KEY | IF SPLIT BUTTON IS FOCUSED, SINGLE FRAME STEP AND SINGLE FRAME RETURN ARE CONTROLLED WHEN SCREEN IS TEMPORALLY SUSPENDED. BY ROTATIONAL OPERATION OF 22.5 DEGREES TO LEFT, ONE SINGLE FRAME RETURN IS ACCOMPLISHED AND BY ROTATIONAL OPERATION OF 22.5 DEGREES TO RIGHT, ONE SINGLE FRAME STEP IS ACCOMPLISHED |
| LEVER KEY | IF SPLIT BUTTON IS FOCUSED, FAST FORWARD AND FAST RETURN OF TITLE, WHICH IS REPRODUCED IN REPRODUCTION FRAME, IS CONTROLLED. IF CHAPTER THUMBNAILS ARE FOCUSED, PAGE SWITCHING OF THE THUMBNAIL LIST IS CONTROLLED. UPPER: NEXT PAGE, LOWER: PREVIOUS PAGE, PUSHING OPERATION IN STOP STATE: REPRODUCTION. PUSHING OPERATION IN REPRODUCTION STATE: SUSPEND, PUSHING OPERATION IN SUSPENSION STATE: REPRODUCTION |
| CURSOR KEY | IF SPLIT BUTTON IS FOCUSED, CHAPTER IS CREATED AND REGISTERED. IF CHAPTER THUMBNAILS ARE FOCUSED, HEAD AND END OF SELECTED CHAPTER ARE PREVIEWED FOR THREE SECONDS AND THEY ARE REPRODUCED |

F I G. 13

MULTI CONTROLLER

CROSS-REFERENCE TO RELATED APPLICATIONS

This application is based upon and claims the benefit of priority from the prior Japanese Patent Application No. 2000-302663, filed Oct. 2, 2000, the entire contents of which are incorporated herein by reference.

BACKGROUND OF THE INVENTION

The present invention relates to a multi controller for transmitting various control signals to a recording/reproduction device which records a movie or the like and reproduces it, and controlling this recording/reproduction device.

In recent years, the research-and-development and manufacturing of DVD (Digital versatile Disk) have been progressed with great speed. In connection with this, the research-and-development and manufacturing of a recording/reproduction device in association with the DVD for recording the information of movies or the like in the DVD and reproducing the information of movies which are recorded in the DVD have been progressed. The recording/reproduction device in association with the DVD is configured such that it can perform various reproduction processing and recording processing with making good use of properties of the DVD. Alternatively, in order to improve operability, the recording/reproduction device in association with the DVD is loaded with a GUI (graphic user interface) function and it is configured so as to input various operations via a graphic displayed on a screen.

As a controller for controlling the aforementioned recording/reproduction device, a remote controller has been known. However, as the number of functions increases, the number of operation buttons on the remote controller also is apt to increase. Therefore, the operation of the remote controller becomes difficult for the user.

Specifically, in the case of the aforementioned recording/reproduction device in association with the DVD, in addition to the normal recording/reproduction operation, an input operation via a graphic displayed on the screen is required in association with a GUI function, so that the operation buttons on the remote controller becomes complicated more and more.

For example, a method for dispersing an operation section in association with the recording/reproduction operation and an operation unit in association with the GUI function may be considered. However, this method becomes very inconvenient in the case that the recording/reproduction operation and the operation in association with the GUI function should be paralleled.

BRIEF SUMMARY OF THE INVENTION

An object of the present invention is to provide a multi controller with an excellent operability. Especially, the object of the present invention is to provide a multi controller which is associated with a recording/reproduction device and a GUI function and has an excellent operability.

In order to solve and attain the above object of the present invention, the multi controller according to the present invention is configured as below.

The multi controller according to the present invention comprises first operating means (supposed to be a cursor key) for generating a control signal to control a first function in association with a declination operation in four or eight directions and generating a control signal to control a second function in association with a pushing operation; second operating means (supposed to be a dial key) for generating a control signal to control a third function in association with a rotation operation in a circular arc; and third operating means (supposed to be a lever key) for generating a control signal to control a fourth function in association with a shifting operation in front and back and generating a control signal to control a fifth function in association with a pushing operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a view explaining a remote controller operation with respect to a GUI screen that the recording is reserved according to the present invention;

FIGS. 11A to 11C are views explaining making reservation of recording and correction of reservation of recording;

FIG. 13 is a view explaining a remote controller operation with respect to an edition GUI;

DETAILED DESCRIPTION OF THE INVENTION

An embodiment according to the present invention will be explained with reference to the drawings below.

Figure 1:
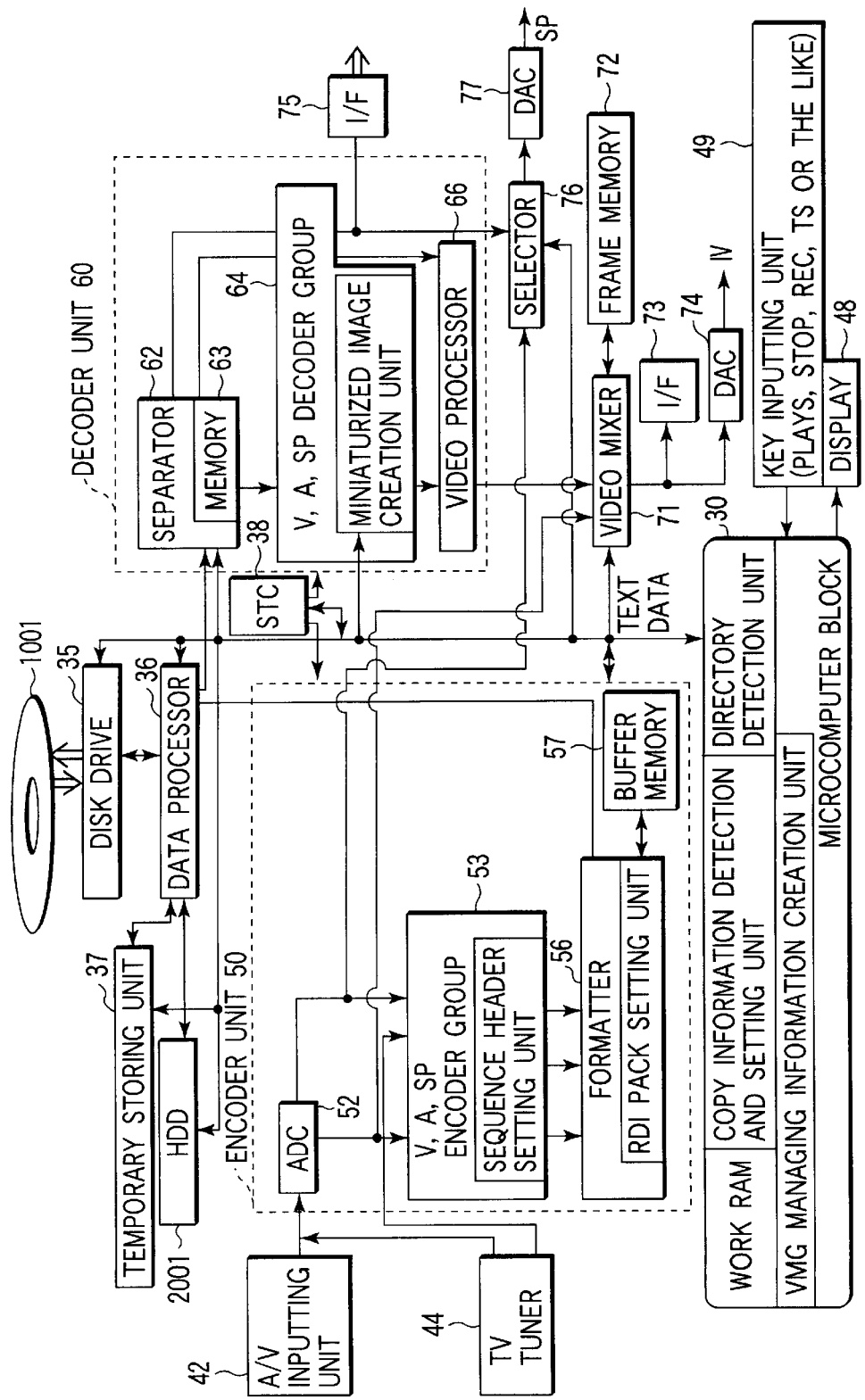
FIG. 1 is a block diagram showing an example of a recording/reproduction device in association with a DVD.

FIG. 1 is a block diagram showing an example of a recording/reproduction device according to the present invention. Categorizing blocks in FIG. 1 broadly, a left side indicates main blocks of a recording section and a right side indicates main blocks of a reproduction unit. Each block in FIG. 1 will be described in detail later.

Figure 2:
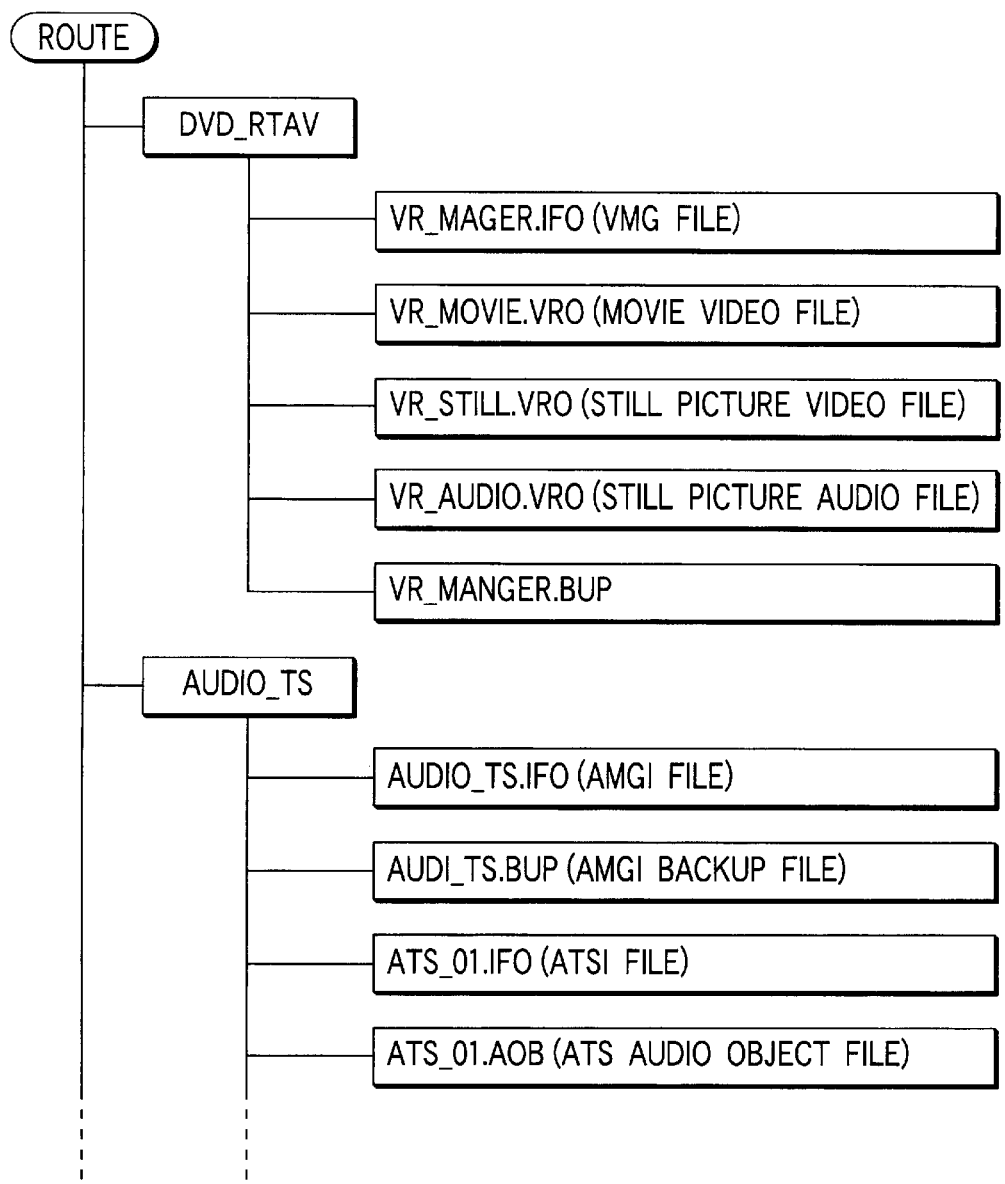
FIG. 2 is a view showing a portion of a directory structure of a DVD system.

FIG. 2 is a view showing a portion of a directory structure of a DVD system. FIG. 2 specifically depicts a directory structure of a real time recording (RTR) DVD and a directory structure of a DVD audio file in the DVD system.

A directory exists for every standard in the DVD. These directories are named as "VIDEO_TS" in a DVD-video, "AUDIO_TS" in a DVD-audio and "DVD_RTAV" in an RTR-DVD, respectively. In FIG. 2, "DVD_RTAV" and "AUDIO_TS" are depicted. The recording data exists in each directory.

Alternatively, the data is stored in a normal file format in the DVD. A title is equivalent to, for example, one volume of a movie. One disk is capable of recording plural titles. An assembly of titles is referred to as a title set. This title set is constituted of plural files.

In the aforementioned DVD-video, in one disk, information to manage the information of this disk is recorded. This managing information is recorded as a file and it is referred to as a video manager (VMG).

Further, in the title set of this DVD-video (VTS), video title set information (VTSI) is provided to manage this title set. It is configured by this VTSI, a video file constituted of the video data and backup of the VTSI.

On the other hand, in the RTR DVD, the foregoing VMG (information to manage the disk information) and the VTSI (information to manage a title set) are integrated and they are defined as new video manager information (VMGI).

In the directory "DVD_RTAV", respective files, namely, VR_MANGR. IFO as a video manager (VMG) file, VR_MOVIE. VRO as a movie video file, VR_STILL. VRO as a still picture audio file, VR_AUDIO. VRO as a still picture audio file and VR_MANAGR. BUP as backup of a video manager are provided.

Alternatively, in the directory "AUDIO_TS", AUDIO_TS. IFO as audio manager information (AMGI) file, AUDIO-TS. BUP as audio manager information (AMGI) backup file, ATS-01-0. IFO as audio title set information (ATSI) file and ATS-01-1. AOB as audio title set (ATS) audio object file are provided.

In the VR_MANGR. IFO file, navigation data is recorded. This navigation data comprises data for progressing a program set, a program, an entry point, a play list and the like.

The VR_MOVIE. VRO file is so called movie AV file for recording a movie video object (movie VOB).

The VR-STILL. VRO is a still picture AV file for recording a still picture VOB.

Further, the VR_AUDIO. VRO is a still picture addition audio file for recording an addition audio stream to the still picture.

The VR_MOVIE. VRO is used to record an original VOB which is structured by a video part including any sub-picture unit. In this case, an audio part in association with the video part is also included in the original VOB.

The VR_AUDIO. VRO is a file which is used to record an addition audio part, and this addition audio part indicates an audio stream which is recorded by after-recording. The audio part recorded in the VR_AUDIO. VRO is used in combination with some video parts which are recorded in the VR-STILL. VRO.

The VR-MANGR. BUP is a backup file of the VR_MANGR. IFO.

Figure 3:
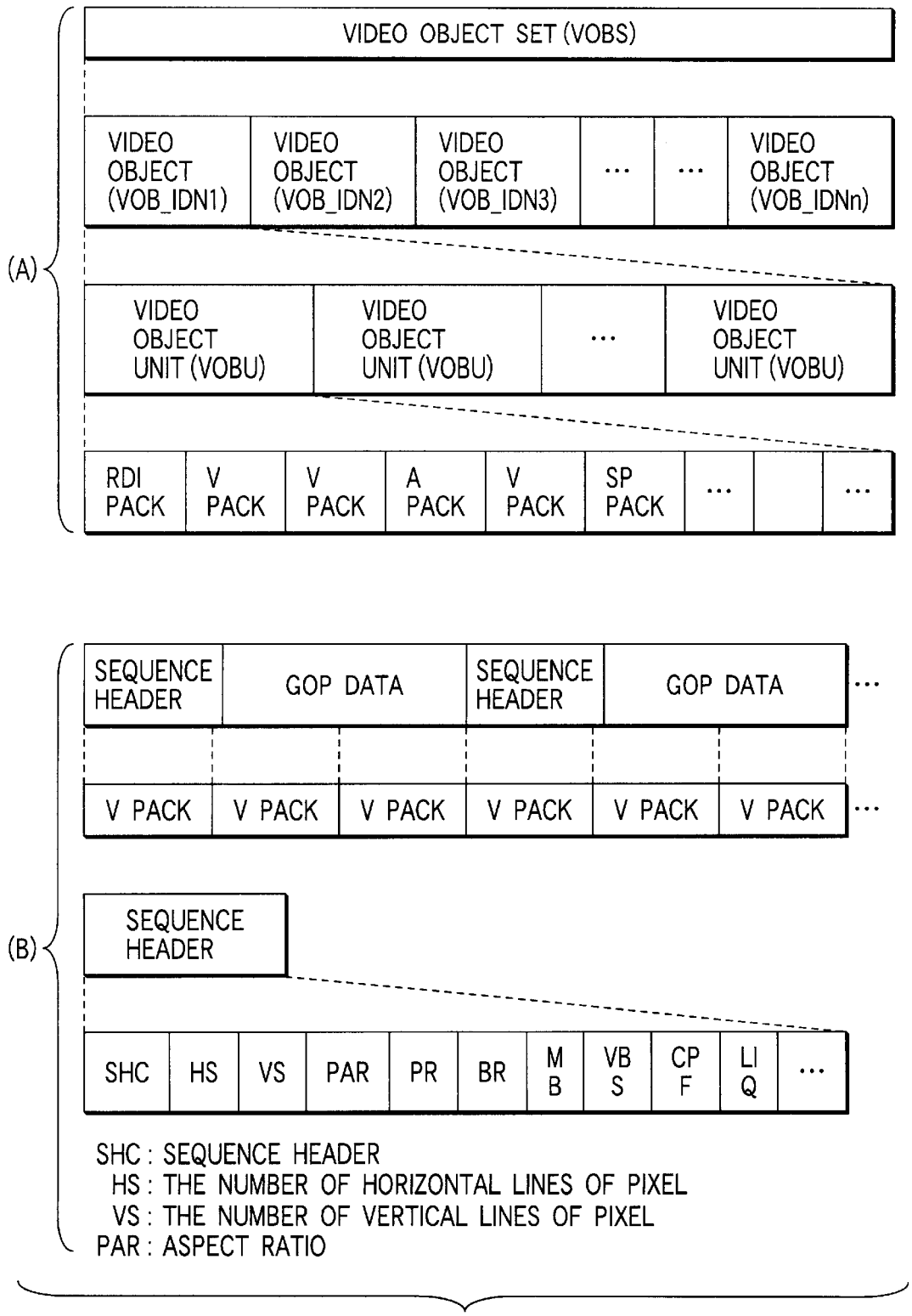
FIG. 3 is a view showing a video object set (VOBS) in a DVD standard and a data structure and a content of the data in a MPEG standard.

(A) of FIG. 3 shows a file structure of the VR-MOVIE. VRO as the above movie video file.

The video file is a hierarchical structure and one file is structured by plural VOBs (video object). Further, one VOB is structured by plural VOBUS (video object unit) and one VOBU is structured by plural packs. There are a RDI pack, a V pack, an A pack or the like as plural packs.

The V pack is the video data which is packed in a format of MPEG2 and it is structured by a pack header, a packet header and a video data section. The A pack is audio data which is processed in a format of, for example, a linear PCM, a MPEG, or an AC3 or the like and it is structured by a pack header, a packet header and an audio data section.

(B) of FIG. 3 shows a format of video data on the basis of a format of the MPEG2 in connection with a V pack.

A group of picture (GOP) is a unit which is packed by using plural video frames and a head thereof is added with a sequence header. In the sequence header, a starting code of the sequence header (SHC), the number of vertical lines of a pixel (HS), the number of horizontal lines of a pixel (VS), an aspect ratio (PAR) and the like are described.

Figure 4:
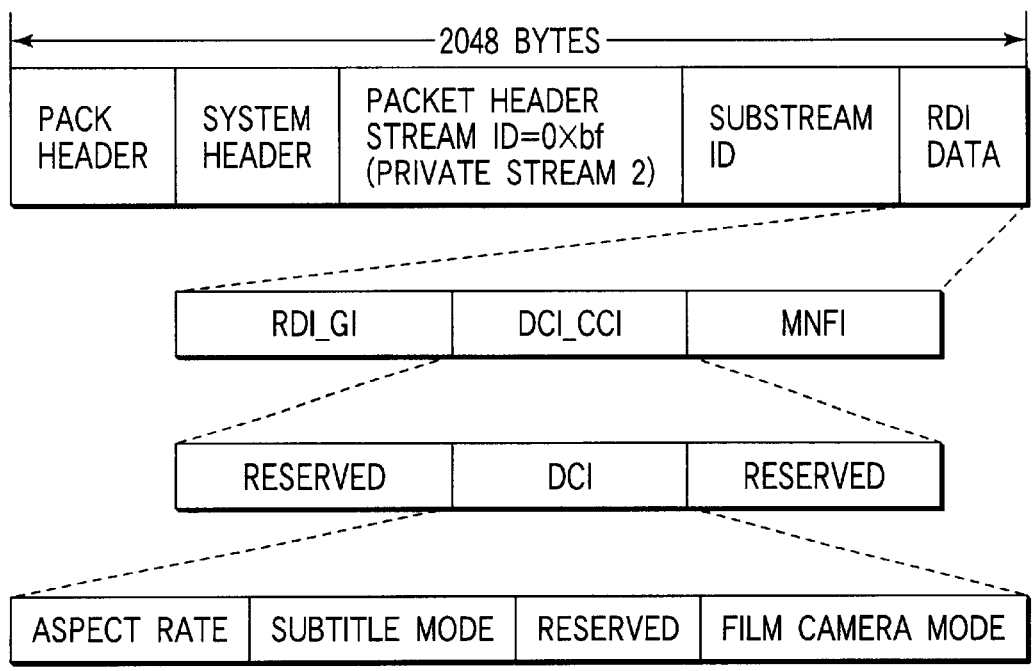
FIG. 4 is a view showing a data structure of a RDI pack.

A RDI pack shown in FIG. 4 is referred to as a real time data information pack (RDI_PCK). It includes real time general information (RDI_GI), display control and copy control information (DCI_CCI) and manufacturer information (MNFI) and the like.

The real time general information (RDI-GI) includes information to indicate a start time when reproduction of a first field of the VOBU to which this real time general information (RDI-GI) attributes starts, in other words, it includes the VOBU_REC_TM.

The display control and copy control information (DCI_CCI) includes (DCI_CCI_SS) indicating a status of the display control information (DCI) and the copy control information (CCI), the display control information (DCI) itself and the copy control information (CCI) itself.

In the (DCI_CCI_SS), the display control information status (DCI_SS) is a first area. The display control information status (DCI-SS) identifies a case that only effective aspect ratio information exists (01b) and a case that the effective aspect ratio, a subtitle mode and a film camera mode exist (11b).

The display control information (DCI) includes the aspect ratio information, the subtitle mode information and the film camera mode.

The aspect ratio information indicates a case that the aspect ratio is 4:3 (000b) and a case that the aspect ratio is 16:9 (0001b). Further, when a source picture is a letter box, the aspect ratio information identifies 1000b (a letter box (14:9) is disposed on a screen center), 0100b (a letter box (14:9) is disposed on a screen top), 1101b (a letter box (16:9) is disposed on a screen center), 0010b (a letter box (16:9) is disposed on a screen top), 1010b (a letter box (>16:9) is disposed on a screen center) and 0111b (a letter box in a full format (14:9) is disposed on a center).

The subtitle mode identifies a case that the subtitle does not open (00b), a case that the subtitle is within an active image area (01b) and a case that the subtitle is outside an active image area (10b).

The film camera mode identifies a camera mode (0b) and a film mode (1b).

A data reproduction order which is recorded in the video file is defined by a program chain (PGC). In this program chain (PGC), a cell (Cell) is defined. Further, in the cell (Cell), the VOB to be reproduces is defined. A portion in which specific information of this PGC is recorded is a program chain information (PGCI) portion in the VMG file. In the PGCI, two kinds of information exist, namely, one is original PGCI (ORG_PGCI) and the other is a user defined PGC table (UD_PGCIT).

Structure of a video manager file (VMG), in which the above program chain information is described, will be explained below.

Figure 5:
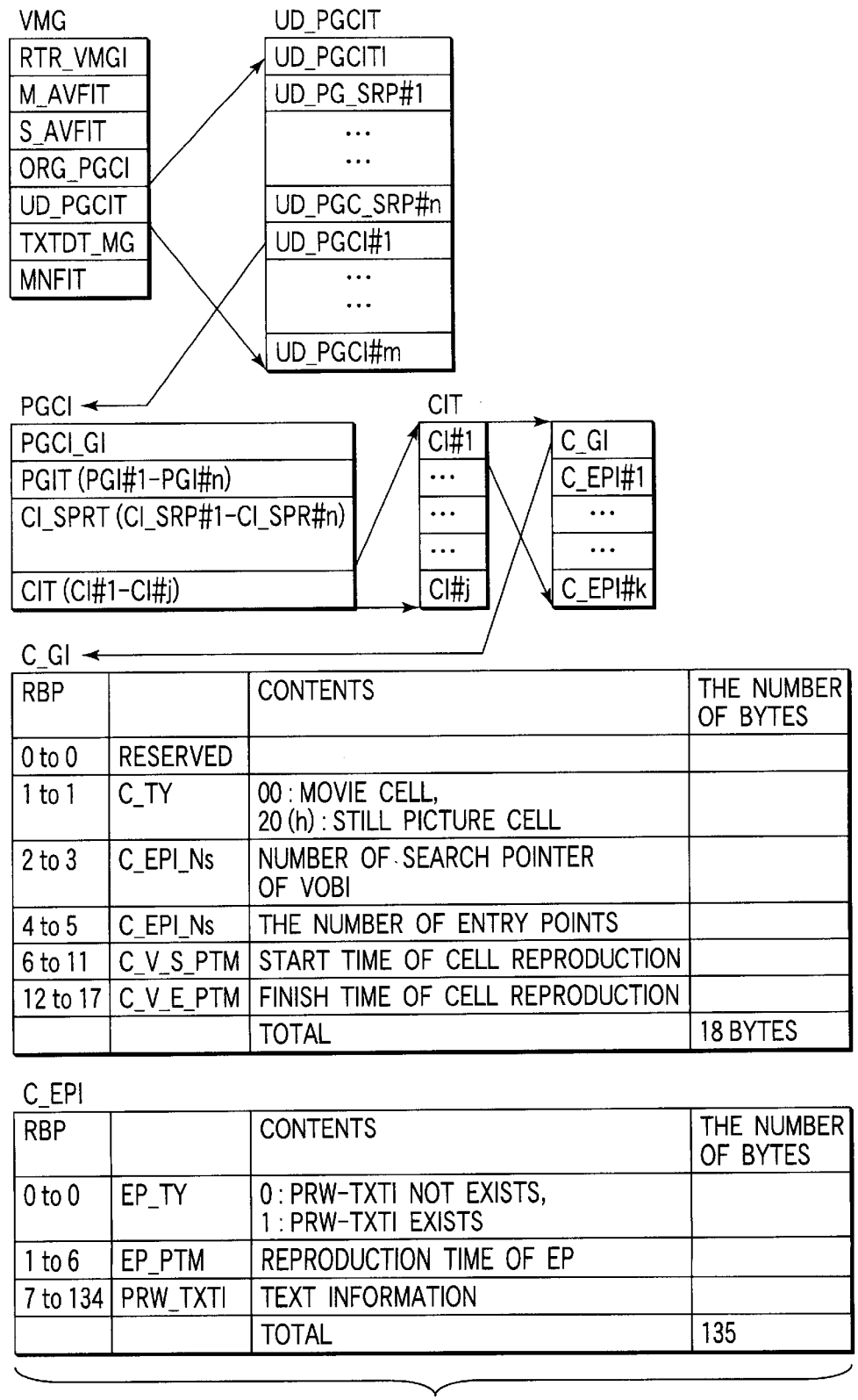
FIG. 5 is a view showing a hierarchical structure of a VMG in the DVD standard, specifically, a hierarchical structure of a program chain.

FIG. 5 depicts the information described in the VMG file in hierarchy. Specifically, FIG. 5 intimately depicts the program chain information (PGCI) in hierarchy.

In the VMG file, there are RTR_VMGI (RTR video manager information), M_AVFIT (movie AV file information table), S_AVFIT (a still picture AV file information table), ORG_PGCI (original program chain information), UD_PGCIT (user defined program chain information), TXTDT_MG (a text data manager) and MNFIT (a manufacture information table).

The ORG_PGCI (original program chain information) is a special PGC for reproducing the data in recording order. In other words, this PGC is information to designate reproducing order of the data and it indicates a program set, i.e., a series of programs. This program set is data which is stored in the VRO file.

The UD_PGCIT (user defined program chain information) also designates reproducing order of the data. However, a program designated by the above ORG_PGCI is partially designated by the user program edition or the like, so that respective portions are connected. Accordingly, the UD_PGCIT is not a series of unified programs but it indicates a series of Cells (cell). The cells is information indicating respective portions of the program.

The ORG_PGCI (original program chain information) and the UD_PGCIT (user defined program chain information) are data structures of which contents are similar to each other. The PGCI is structured by PGC general information (PGC_GI), a PGC information table (PGCIT), a cell information search pointer (CI_SRPT), and a cell information table (CIT).

In this PGC general information (PGC_GI), the number of programs (0 in the UD-PGC) and the number of cell search pointers in this PGC are described.

In the PGC information table (PGCIT), program information (PGI) is described. The program information (PGI) include a program type (PG_TY) indicating whether the program is protected against deletion or not, the number of cells in this program (C_Ns), primary text information (PRM_TEXTI) indicating a character set, a number of an item text search pointer in association with this program (IT_TXT_SRPN), a cell number and representative image information (REP_PICTI) indicating a picture point.

In a cell information search pointer (CI_SRPT), a start address of cell information (CI) is described. In the cell information table (CIT), the cell information (CI#1 to CI#j) which is designated by the search pointer are described.

In the cell information (CI), cell general information (C_GI) and cell entry point information (C_EPI#1 to C_EPI#k) are described. The cell general information will be described later. There are two types of the cell entry point information (C_EPI), namely, a type A and a type B.

In the type A of the cell entry point information (C_EPI), identification of the entry point type (a type A or a type B) and a presentation time (EP_PTM) of the entry point are described. The presentation time (EP_PTM) indicates a reproduction time of the entry point. Specifically, (EP_PTM) indicates a reproduction start time of the first video field and a reproduction time of the last video field which are encoded as a presentation time stamp in a corresponding VOB. In the type B of the cell entry point information (C_EPI), primary text information in the entry point exists in addition to the type A of the information.

The above cell general information (C_GI) has a cell type (C_TY) and a number (M_VOB-SRPN) of the search pointer of the VOBI in association with the VOB which is designated by the cell. Further, the above cell general information (C_GI) has the number of the cell entry points (C_EPI-Ns), a start time of the cell reproduction (C_V_S_PTM) and a finish time of the cell reproduction (C_V_E_PTM).

Figure 6:
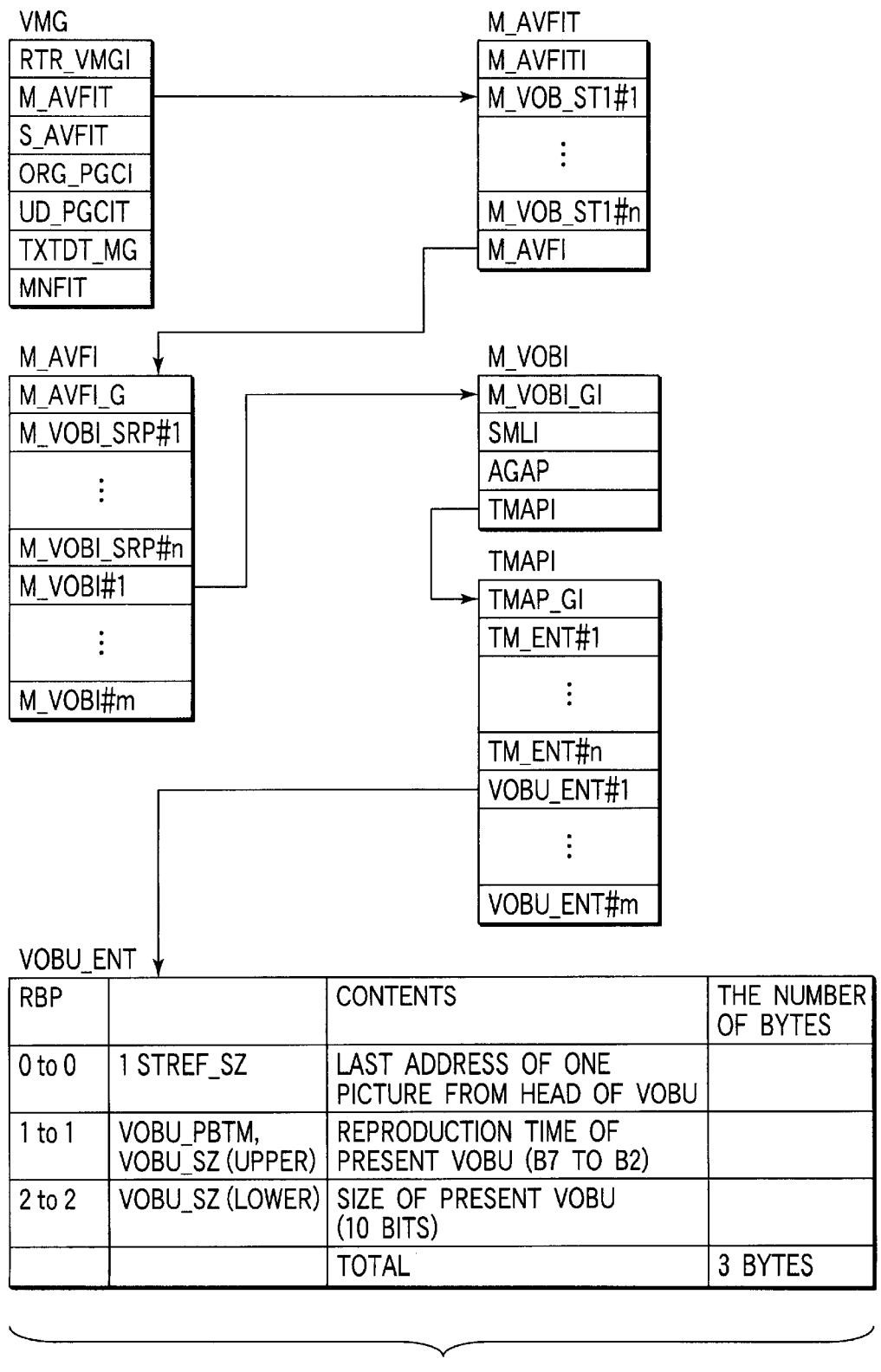
FIG. 6 is a view showing a hierarchical structure of a VMG in the DVD standard, specifically, a hierarchical structure of an AV file information table.

Similarly, FIG. 6 depicts the information described in the VMG file in hierarchy. Specifically, FIG. 6 intimately depicts a movie AV file information table (M-AVFIT) in hierarchy.

In the above M_AVFIT, a movie AV file information table information (M_AVFIT), movie VOB stream information (M_VOB_STI#n) (n=1 to n) and movie AV file information (M_AVFI) are described.

The movie AV file information (M_AVFI) will be described below.

In the movie AV file information (M_AVFI), M_AVFI general information (M_AVFI_GI), M_VOB information search pointer (M_VOBI_SRP#n) and movie video information (M_VOBI#n) are described.

In the M_AVFI general information, the number of M-VOB search pointers and a starting address of the M-VOB information are described.

In the M-VOB information #n, the M_VOB general information (M_VOB_GI), seamless information (SMLI), audio gap information (AGAPI) and time map information (TMAPI) are described.

In the M_VOB_GI, a VOB type is described to indicate whether this VOB is in a normal status or it is in a status that it is deleted tentatively. In the audio stream, an audio status is described to indicate whether this VOB is originally recorded when it is created or it is corrected partially or entirely.

Further, in the M_VOB_GI, a recording time of this VOB and recording minutes as substitution are recorded. Furthermore, in this M_VOB_GI, the number of stream information of the M_VOB, a video start time of this VOB, a finish time of this VOB and copy protection information are described.

Next, movie video information (M_VOBI#n) will be explained below. This M-VOBI#n is specified by M-VOBI-SRP#n.

In the movie video information (M_VOBI#n), the VOB type is described to indicate whether this VOB is in a normal status or it is in a status that it is deleted tentatively. In the audio stream, an audio status is described to indicate whether this VOB is originally recorded when it is created or it is corrected partially or entirely.

Further, in the M_VOB_GI, a recording time of this VOB and recording minutes as substitution are recorded. Furthermore, in this M_VOB_GI, the number of stream information of the M_VOB, a video start time of this VOB, a finish time of this VOB and copy protection information are described.

Next, the above time map information (TMAPI) will be explained below.

TMAPI is used for converting the presentation time into an offset address. This information is prepared not only for normal reproduction, but also for special reproduction and time search.

The TMAPI is structured by time map general information (TMAP_GI), a time map entry table (TM_ENT#1 to #n) and a video object entry table (VOBU_ENT#1 to #n) in association with this entry information.

Each TM_ENT includes the address information of a corresponding VOBU, and further includes time difference information between a reproduction time which is specified by a time entry and a reproduction start time of the VOBU.

Each VOBU_ENT includes a reproduction time of each VOBU and size information thereof. The size of the VOBU is measured by a logical block and the reproduction time thereof is measured by the video field.

The TMAP_GI has the number of time entries (TM_ENT_Ns), the number of the VOBU entries (VOBU_ENT_Ns), time offset (TM_OFS) and address offset (ADR_OFS).

Next, VOBU ENT will be described below.

The VOBU_ENT is structured by (1STREF_SZ), in which an address of a first reference image of this VOBU is described, (VOBU_PB_TM) in which a reproduction time of this VOBU is described and (VOBU_SZ) in which the size of this VOBU is described. The first reference image is the last address of I picture from a head of the VOBU, and is an address of the data which is primarily required to decode the video in the VOBU. The reproduction time of the VOBU is indicated by the number of video fields in this VOBU. Further, the size of the VOBU is indicated by the number of packs in this VOBU.

The above RTR_VMGI will be described below.

This RTR_VMGI roughly includes two items of information. One is VMGI_MAT (video manager information management table) and the other is PL_SRPT (play list search pointer table).

In the VMGI_MAT, there are described a VMG identifier to identify the VMG, a RTR_VMG finish address as information to indicate a finish position of the VMG, a RTR_VMGI finish address as information to indicate a finish position of this VMG information, a version number of this book, a time zone as information indicating time when various data is recorded or updated in this disk, a still time for a still picture, a character set code for a primary text, resume mark information in which necessary information (a program chain number or the like) for reproducing the disk after the disk reproduction is once stopped is described, disk representative picture information in which the necessary information for reproducing a disk representative image is described, and a disk representative name as description information by a character code set for indication a representative name of this disk. Further, a start address of M_AVFIT, a start address of S_AVFIT, a start address of ORG_PGCI, a start address of UD_PGCI, a start address of TXTDT_MG and a start address of MNFIT are described, which are stored in the next place.

In the PL_SRPT, the number of play list search pointers and the search pointers of respective play lists are described. The play list is a list indicating parts of the program and the reproduction order thereof is capable of being designated by the user. The play list is defined by a user defined PGC to be described later. The play list search pointer includes respective information such as a play list type for identifying an object to be reproduces, i.e., a movie or a still or the like, a number of a program chain in association with this pointer and a time when the play list is created and primary text information or the like for the play list.

A recording/reproduction device of the disk which is standardized as described above will be explained with reference to FIG. 1.

The reproduction processing in the recording/reproduction device is performed in accordance with PGCI. According to this PGCI, it is possible to designate a plurality of programs. In this program, a cell is defined and the VOB to be reproduced is designated by the cell. Further, a special PGC for reproducing in a recording order is referred to as an original PGC. This original PGC information is recorded as ORG_PGCI. Further, attribution information of this video data (resolution information, aspect information and voice attribution information or the like) are recorded in STI in the VMGI. The aforementioned pack is a minimum unit for performing data transfer processing. Further, the minimum unit for performing logical processing is in units of cell and the logical processing is performed in this unit. Therefore, when picture recording is performed, the recording signal is converted in a format which corresponds to the above format.

Main component parts of the recording/reproduction device comprise a hard disk drive (HDD) 2001, a disk drive 35, an encoder section 50, a decoder section 60 and a microcomputer tub lock 30. The HDD 2001 rotatably drives the hard disk as the recording medium. Simultaneously, the HDD 2001 records the information in this hard disk and reads out the information recorded in this hard disk. The disk drive 35 rotatably drives an optical disk 1001 as the recording medium. Simultaneously, the disk drive 35 records the information in this optical disk 1001 and reads out the information recorded in this optical disk 1001. The encoder section 50 encodes the information to be recorded in the hard disk and the optical disk 1001. The decoder section 60 decodes the information which is read out from the hard disk and the optical disk 1001. The microcomputer tub lock 30 entirely controls the recording/reproduction device. For example, the microcomputer tub lock 30 receives various operation instructions from a key input section 49 and controls in accordance with the operation instructions.

The encoder section 50 comprises an ADC (analog digital converter) 52, an encoder group 53 including a V (video) encoder, an A (audio) encoder and a SP (sub picture) encoder, a formatter 56 to make output from each encoder into a predetermined format and a buffer memory 57.

An exterior analog video signal and an exterior analog audio signal from an AV input section 42, or an analog video signal and an analog voice signal from a TV (television) tuner 44 is inputted in the ADC 52.

The ADC 52 digitizes the inputted analog video signal with, for example, a sampling frequency of 13.5 MHz and quantization bit number of eight. In other words, luminance component Y, color difference component Cr (or Y−R) and color difference component Cb (or Y−B) are quantized with eight bits, respectively.

Similarly, the ADC 52 digitizes the inputted analog audio signal with, for example, a sampling frequency of 48 kHz and quantization bit number of 16.

When the digital video signal and the digital audio signal are inputted in the ADC 52, the ADC 52 makes the digital video signal and the digital audio signal pass through. Jitter reduction processing and sampling rate change processing or the like may be performed with respect to these digital video signal and the digital audio signal without changing the contents thereof.

The digital video signal which is outputted from the ADC 52 is transmitted to the formatter 56 via the V encoder. Alternatively, the digital audio signal which is outputted from the ADC 52 is transmitted to the formatter 56 via the A encoder.

The V encoder has a function to convert the inputted digital video signal into a digital signal which is compressed by a variable bit rate on the basis of the MPEG2 or the MPEG1 standard. Further, the A encoder has a function to convert the inputted digital audio signal into a digital signal which is compressed by a fixed bit rate or a digital signal of a liner PCM on the basis of the MPEG or a AC-3 standard.

In the case that a sub-image information is inputted from the AV input section 42 (for example, a signal from a DVD video player with an independent output terminal of a sub-image signal), or in the case that a DVD video signal with such a data structure is broadcasted and it is received by the TV tuner 44, the sub-image signal (the sub-image pack) in the DVD video signal is inputted in the SP encoder. The sub-image signal which is inputted in the SP encoder is arranged into a predetermined signal format to be transmitted to the formatter 56.

The formatter 56 outputs the recording data which corresponds to a format (a file structure) as above described with reference to FIGS. 3 and 4, to a data processor 36 by performing a predetermined signal processing with respect to the inputted video signal, the inputted audio signal, the inputted sub-image signal and the like, as it uses the buffer memory 57 as a working area.

Here, the present device is capable of providing the information encoded by the encoder section 50 and the managing information created by the encoder section 50 to the HDD 2001 via the data processor 36 and recording them in the hard disk. Further, the present device is capable of recording the information recorded in the hard disk in the optical disk 1001 via the data processor 36 and the disk drive 35. Furthermore, the present device is capable of recording the information encoded by the encoder section 50 and the managing information created by the encoder section 50 in the optical disk 1001 via the data processor 36 and the disk drive 35.

Further, according to the present invention, it is possible to record the information in the hard disk in the optical disk without the encoding processing in the case that the information recorded in the hard disk of he HDD 2001 is the same as the data format of the optical disk 1001.

On the other hand, in the case that the information recorded in the hard disk of the HDD 2001 is different from the data format of the optical disk 1001, the information read out from the hard disk is encoded by the encoder section 50. Then, it is possible to record the encoded information in the optical disk 1001.

Here, a content of the standard encode processing will be briefly explained for creating recording data to the above optical disk 1001. In other words, when the encoding processing starts in the encoder section 50, a parameter is set, which is necessary for performing the encode processing of the video (a main image) data and the audio data.

Then, by using the set parameter and performing pre-encoding processing of the main image data, distribution of quantity of codes which is optimum for the set average transfer rate (recording rate) is calculated. The encoding processing of the main image data is performed on the basis of the distribution of quantity of codes which is obtained by pre-encoding processing. In this case, the encoding processing of the audio data is simultaneously performed. Similarly, the parameter which is necessary for performing the encoding processing of the sub-image data is set and the encoded sub-image data is created.

The encoded main image data, the encoded audio data and the encoded sub-image data are combined to be converted into a structure of a video object set VOBS.

In other words, a cell as the minimum unit of the main image data (video data) is set and the cell information as described in FIG. 5 is created. Then, a cell for structuring the program chain PGC is set. Further, attribution information of the main image, the sub-image and the audio are set and the VMG file including various information is created. As a portion of the attribution information, the information which is obtained upon encoding each data is used.

The encoded main image data, the audio data and the sub-image data are segmented into packs (FIG. 3) with a predetermined size (2048 bytes). Dummy packs are appropriately inserted into these packs. Alternatively, the time stamps such as the PTS (presentation time stamp) indicating a reproduction time and the DTS (decoding time stamp) indicating the decoding time and the like are appropriately described. The main image data in the same reproduction time zone or the time arbitrarily delayed than the PTS of the audio data are capable of being described in the PTS of the sub-image.

Each cell is disposed by disposing the RDI pack (corresponding to a navigation pack) at a head of the video object unit VOBU in units of the video object unit VOBU so that each data is capable of being reproduced in a time code order. Thus, a video object VOB which is structured by a plurality of cells is structured. A video object set VOBS which is composed by collecting at least one of this video object VOB is recorded in the movie video file.

Alternatively, in the case that the DVD reproduction signal is digitally copied from the DVD video player, contents of the above cell, the program chain, the managing table, the time stamp and the like are predetermined, so that it is not needed to newly form them. However, in the case that the DVD video recorder is configured so that it can digitally copy the DVD reproduction signal, it is necessary to consider an electron watermark and other Copy Right protection means.

A part for reading and writing (recording and reproducing) the information from and in the optical desk 1001 comprises a disk drive 35 having an optical system and a driving system, a data processor 36, a temporary storage section 37 and a STC (a system time counter or a system time clock) 38.

The temporary storage section 37 is used to buffer a specific quantity of the data written in the optical disk 1001 (the data to be outputted from the encoder section 50) via the data processor 36 and the disk drive 35 or to buffer a specific quantity of the data reproduced by the optical disk 1001 (the data to be inputted in the decoder section 60) via the disk drive 35 and the data processor 36. The disk drive 35 has a rotation controlling system with respect to the optical disk, a laser driving system, the optical system and the like.

For example, when the temporary storage section 37 is configured by a semiconductor memory (DRAM) of 4 Mbytes, it is possible to record the data for about eight seconds or to buffer the reproduction data with the average recording rate of 4 Mbps (bits per second). Alternatively, when the temporary storage section 37 is configured by an EEP (electrically erasable and programmable) ROM (flash memory) of 16 Mbytes, it is possible to record the data for about thirty seconds or to buffer the reproduction data with the average recording rate of 4 Mbps.

Further, when the temporary storage section 37 is configured by a micro hard disk drive of 100 Mbytes, it is possible to record the data for not less than three minutes or to buffer the reproduction data with the average recording rate of 4 Mbps.

The temporary storage section 37 also may be used to temporally store the recording information for a short period until the optical disk 1001 is replaced with a new disk in the case that the optical disk 1001 is consumed in the middle of recording.

However, since the present device is provided with the HDD 2001 with large capacity, this HDD 2001 can be used in the above case.

Alternatively, in the case that a high speed drive (not less than double speed) is employed as the disk drive 35, the temporary storage section 37 also may be used to store the extra data which is read out from a normal drive during period of time. If the read data upon reproduction is buffered in the temporary storage section 37, making the switch to the reproduction data, which is buffered in the temporary storage section 37 allows the reproduction image to be continued even when an optical head (not illustrated) generates an error of reading out due to oscillating shock or the like.

In accordance with controlling of the microcomputer block 30, the data processor 36 provides the DVD recording data which is outputted from the encoder section 50 to the disk drive 35, fetches the DVD reproduction signal which is reproduced from the optical disk 1001 from the disk drive 35, rewrites the managing information which is recorded in the optical disk 1001 and deletes the data (a file or a video object) which is recorded in the optical disk 1001.

In accordance with the microcomputer block 30, the microcomputer block 30 includes a MPU (micro processing unit) or a CPU (central processing unit), a ROM in which the control program or the like is written and a RAM for providing a working area which is needed to execute the program.

In accordance with the control program stored in the above ROM, the MPU of the microcomputer block 30 uses the RAM as the working area so as to detect a defective place, detect the unrecorded area, set a place to record the recorded image information, record a UDF and set an AV address or the like.

Additionally, the microcomputer block 30 has an information processing section, which is needed to control the system entirely. The microcomputer block 30 is provided with a copied information detection and setting section, a directory detection section and a VMG managing information forming section.

In performing results of the MPU, the content to be notified the user of the disk drive 35 is displayed on a display 48 of a DVD video recorder or it is OSD (on screen display) displayed on a monitor display.

Additionally, timing that the microcomputer block 30 controls the disk drive 35, the data processor 36, the encoder section 50 and the decoder section 60 and the like is capable of being executed on the basis of time data from the STC 38. The recording operation and the reproduction operation are normally performed in synchronization with a time clock from the STC 38. However, other processing may be performed at the timing independent of the STC 38.

The decoder 60 is provided with a separator 62, a memory 63, a decoder group 64 and a video processor 66. The separator 62 separates and takes out each pack from the image information having a pack structure as shown in FIG. 3. The memory 63 is used upon separating the packs and performing other signal processing. The decoder group 64 is configured by a V decoder, a SP decoder and an A decoder. The V decoder decodes the main image data (a content of the video pack) which is separated by the separator 62. The SP decoder decodes the sub-image data (a content of the sub-image pack) which is separated by the separator 62. The A decoder decodes the audio data (a content of the audio pack) which is separated by the separator 62. The video processor 66 appropriately combines the sub-image data which is obtained from the SP decoder with the main image data which is obtained from the V decoder. Then, the video processor 66 superimposes a menu, a highlight button, a caption and other sub-images on the main image to output them.

An output from the video processor 66 is inputted in a video mixer 71. The video mixer 71 synthesizes text data. Further, the video mixer 71 is connected to a line for directly taking the signal from the TV tuner 44 or the A/V input section 42. Further, the video mixer 71 is connected to a frame memory 72 which is used as a buffer. In the case that the output from the video mixer 71 is a digital output, it is outputted to outside via the interface (I/F) 73. In the case that the output from the video mixer 71 is an analog output, it is outputted to the outside via the DAC 74.

In the case that the output of the A decoder is a digital output, it is outputted to the outside via the interface (I/F) 75. In the case that the output from the A decoder is an analog output, it is analog converted by the DAC 77 via the selector 76 to be outputted to the outside. The selector 76 is capable of selecting the output from the ADC 52 with the select signals from the microcomputer block 30 upon directly monitoring the signal from the TV tuner 44 and the A/V input section 42. The analog audio signals are provided to an exterior component (a multichannel stereo apparatus having two channels to six channels) which is not illustrated here.

A flow of the video signal in the above apparatus will be briefly described as follows.

At first, the inputted AV signal is converted to digital signal by the ADC 52. The video signal is inputted in the V encoder, the audio signal is inputted in the A encoder and the character data such as character broadcast or the like is inputted in the SP encoder. The video signal is compressed in the MPEG, the audio signal is compressed in the AC3 or compressed in the MPEG audio and the character data is compressed to a LAN length.

The compressed data from each encoder is packetized so that they become 2048 bytes in the case of being packed and they are inputted in the formatter 56. Each packet is packed and further multiplexed in the formatter 56 to be transmitted to the data processor 36.

Here, the formatter 56 forms a RDI pack on the basis of the information from an aspect information detecting section 43 and arranges it on a head of the video object unit (VOBU).

The data processor 36 forms an ECC block per 16 packs, attaches error correction data to the ECC block and records the output in the optical disk 1001 via the disk drive 35.

Here, assuming the case that the disk drive 35 is seeking and jumping to tracks, the output is entered in the temporary storage section 37 (for example, the HDD buffer unit) in the case that the disk drive is busy and it should wait until the DVD-RAM drive section (the disk drive 35) is ready.

Further, the formatter 56 forms each cut information during recording and periodically transmits it to the MPU of the microcomputer block 30 (the information on interruption in the GOP head or the like).

As the cut information, the number of packs of the VOBU, an end address of the I picture from the VOBU head and the reproduction time of the VOBU and the like are considered.

Simultaneously, the information from the aspect information detecting section 43 is transmitted to the MPU at the start of recording and the MPU forms the VOB stream information (STI). Here, the STI stores the resolution data and the aspect data and each decoder section is initialized on the basis of this information upon reproduction.

Alternatively, one video file is provided per disk in the DVD-RAM.

In the recording/reproduction device utilizing the DVD, it is important that at least a continuous sector is needed in order to continuously reproduce the data during accessing (seeking) the data. This unit of the sectors is referred to as a CDA (continuous data area).

It is advantageous that this CDA is in units of ECC blocks. Thus, the CDA size becomes multiple number of sixteen and the file system records the data in units of this CDA. However, in the case that there is no vacant area with the size for the CDA in the disk, a short sector which is used by other file is allowed to enter the CDA. Thus, it becomes possible to record the data in units of the CDA.

The present device is provided with a time slip (TS) function. Thus, the HDD 2001 is effectively used. In other words, the information which has been broadcasted from the A/V input section or the TV tuner is recorded in the hard disk by the HDD 2001. It is possible to read out the recorded information, decode it and monitor it with continuing recording. Alternatively, it is possible to record the information which is read out from the hard disk in the optical disk 1001. It is possible to record the monitored information in the hard disk as well as to decode and monitor the recorded information.

The HDD 2001 is contained in the recording/reproduction device. The optical disk 1001 is removable, so that the user is capable of exchanging it freely.

Since the recordable time of the DVD media is short, the aforementioned recording/reproduction device is used in different types of mediums and a hybrid system. For example, the HDD with a large capacity, i.e., 20 GBytes to 40 GBytes, is generally used for a computer. Using such HDD allows the recordable time to get longer not less than the recordable time by VTR in a current VHS system. Alternatively, as described above, this recording/reproduction device has a time slip function in which a property of a medium is effectively used. This function is a function capable of reproducing the recorded information with recording the information such as a movie or the like. This function is not capable of being realized by the above analog VTR in the VHS system or the like and even by the digital VTR in the D-VHS or the like. Therefore, this recording/reproduction device has three kinds of operation states, i.e., "recording", "reproduction" and "time slip". Alternatively, such a recording/reproduction device in a hybrid system has a medium remaining amount displaying function in order to indicate the user which of the optical disk or the hard disk is available to record. Simultaneously, a bit rate (a recording rate) upon recording is important, so that a bar graph is displayed to clearly indicate the bit rate to the user.

Control of the recording/reproduction device in association with the aforementioned DVD requires many keys. However, the operability deteriorates when the number of keys merely increases. Therefore, a multi controller according to the present invention (a remote controller to be described later) is configured as follows.

Figure 7:
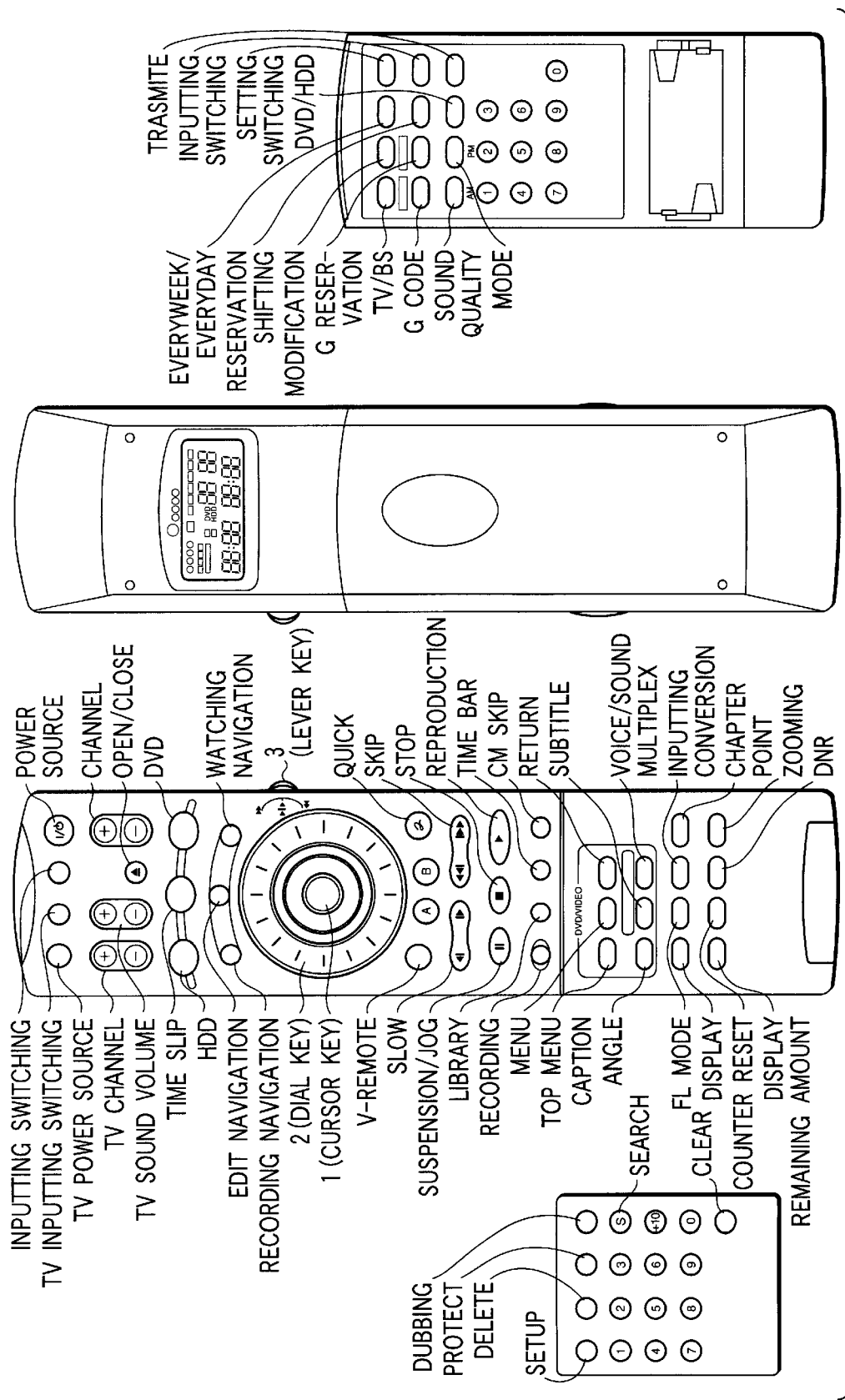
FIG. 7 is a view showing an appearance of a remote controller (multi controller) according to an example of the present invention.

FIG. 7 is a view showing an appearance of a remote controller according to an example of the present invention. As shown in FIG. 7, the remote controller is provided with a cursor key 1 as first operating means, a dial key 2 as second operating means and a lever key 3 as third operating means, and the like. The key input section 49 in FIG. 1 corresponds to the remote controller shown in FIG. 7.

The cursor key 1 generates a control signal for controlling a first function in association with a declination operation in plural directions, for example, four or eight directions and it generates a control signal for controlling a second function in association with a pushing operation. The dial key 2 generates a control signal for controlling a third function in association with a rotating operation in a circular form. For example, the dial key 2 corresponds to a rotary encoder (not illustrated), so that a control signal is generated by the rotary encoder in association with the rotating operation of the dial key. The lever key 3 generates a control signal for controlling a fourth function in association with before-and-after moving operation and generates a control signal for controlling a fifth function in association with the pushing operation.

The cursor key 1 and the dial key 2 are concentrically disposed. Further, the lever key 3 is disposed from predetermined distance from a center of this concentric circle. For example, if the user grips the remote controller with putting his or her right hand thumb on the cursor key 1 so as to operate the cursor key 1, the user is capable of operating the three kinds of operating sections without griping again but with only his or her right hand thumb.

Figure 8:
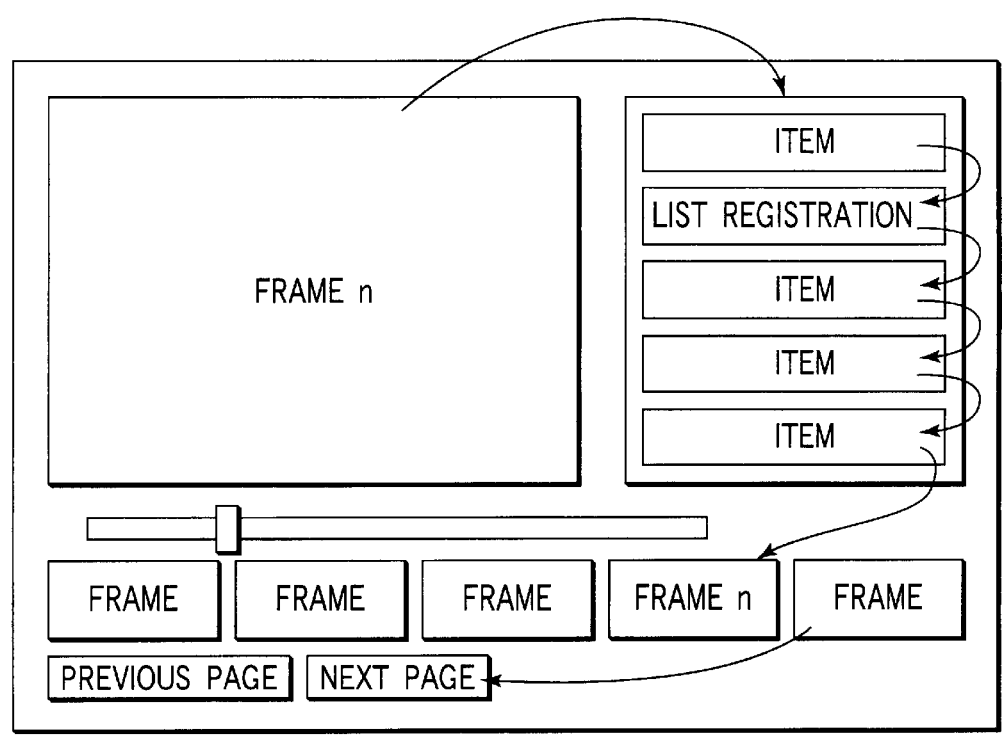
FIG. 8 is a view explaining an operation with respect to a GUI screen by a conventional remote controller.
Figure 9:
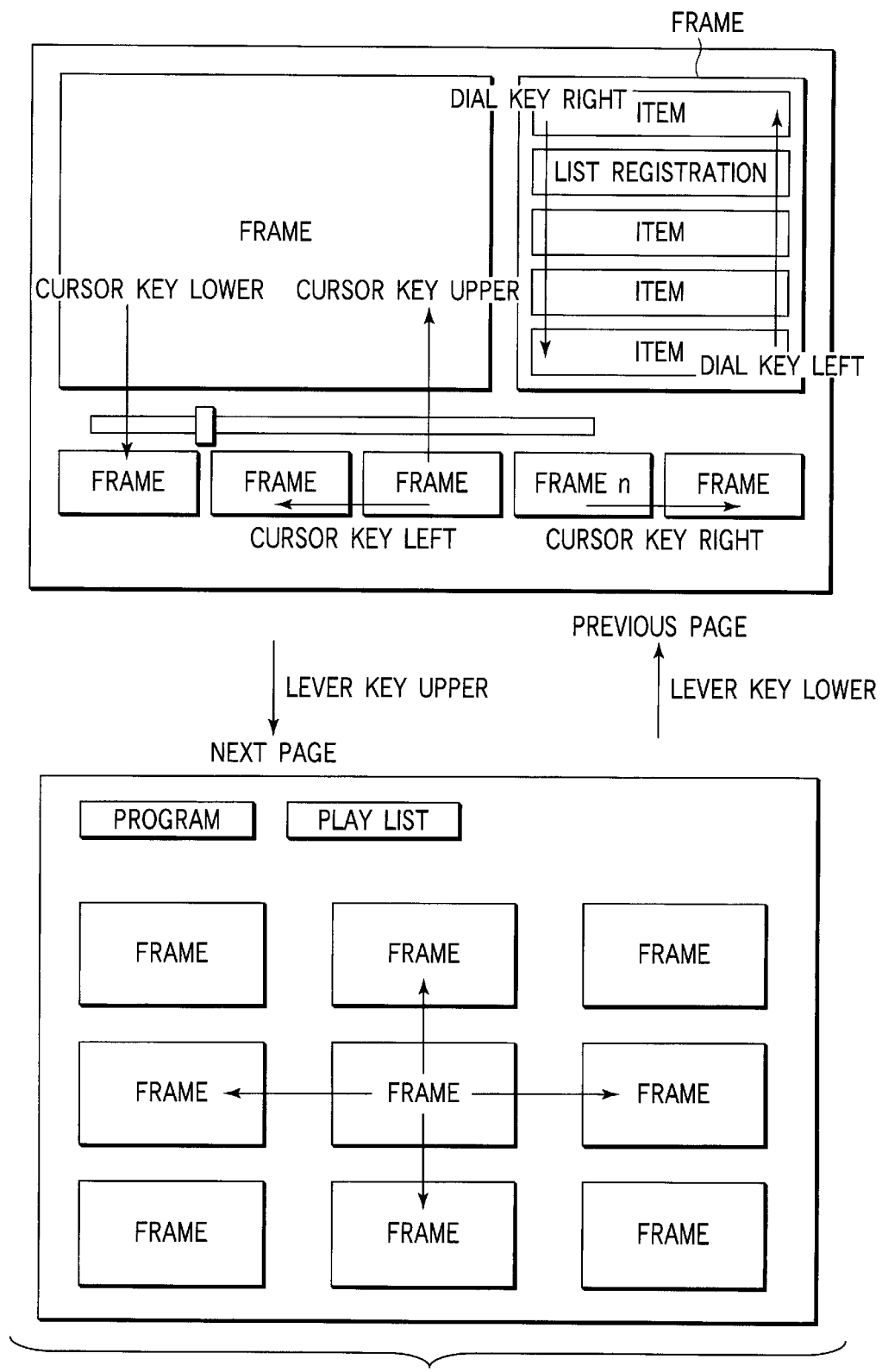
FIG. 9 is a view explaining an operation with respect to a GUI screen by a remote controller according to the present invention.
Figure 11A:
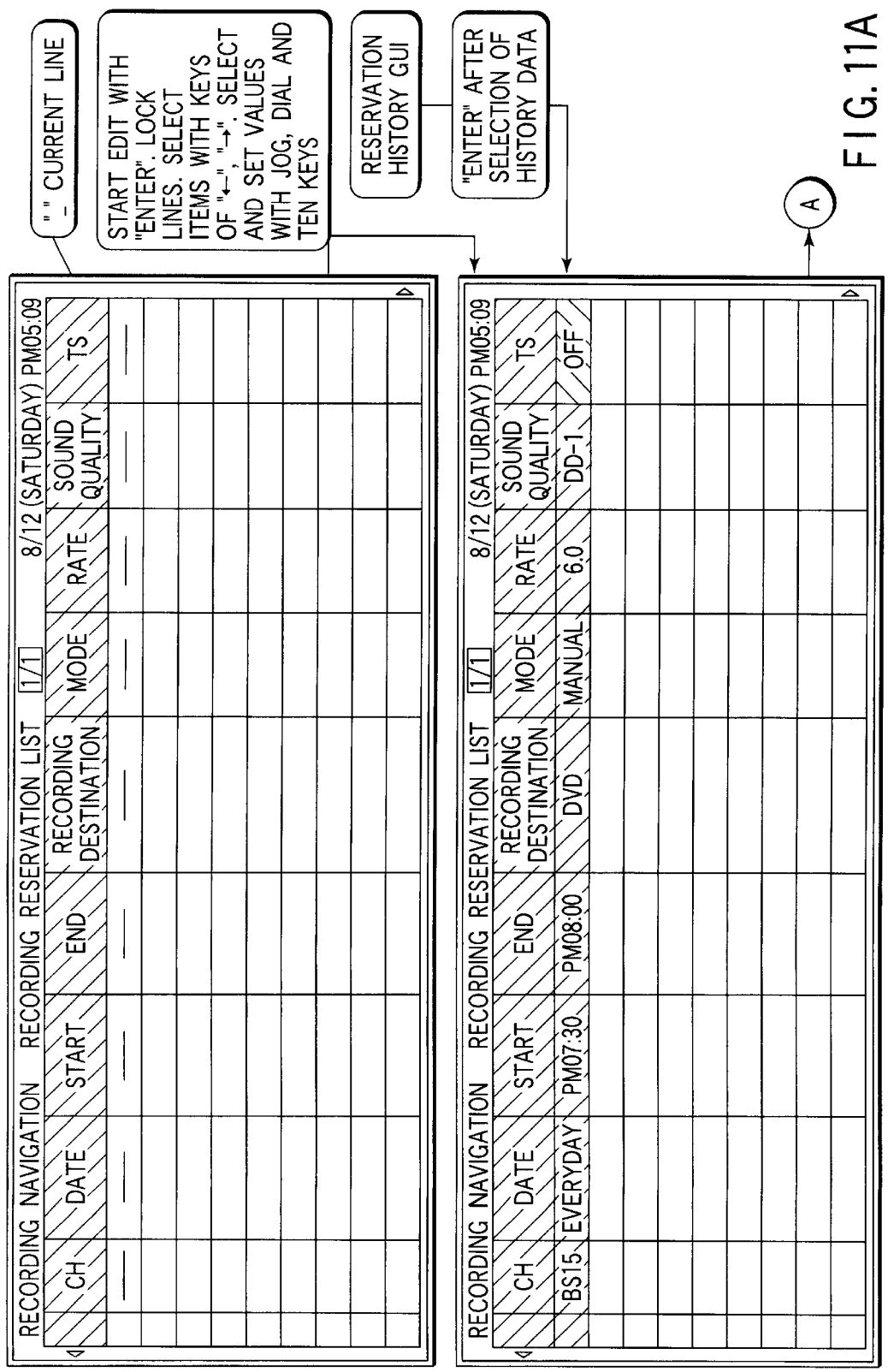
Figure 12:
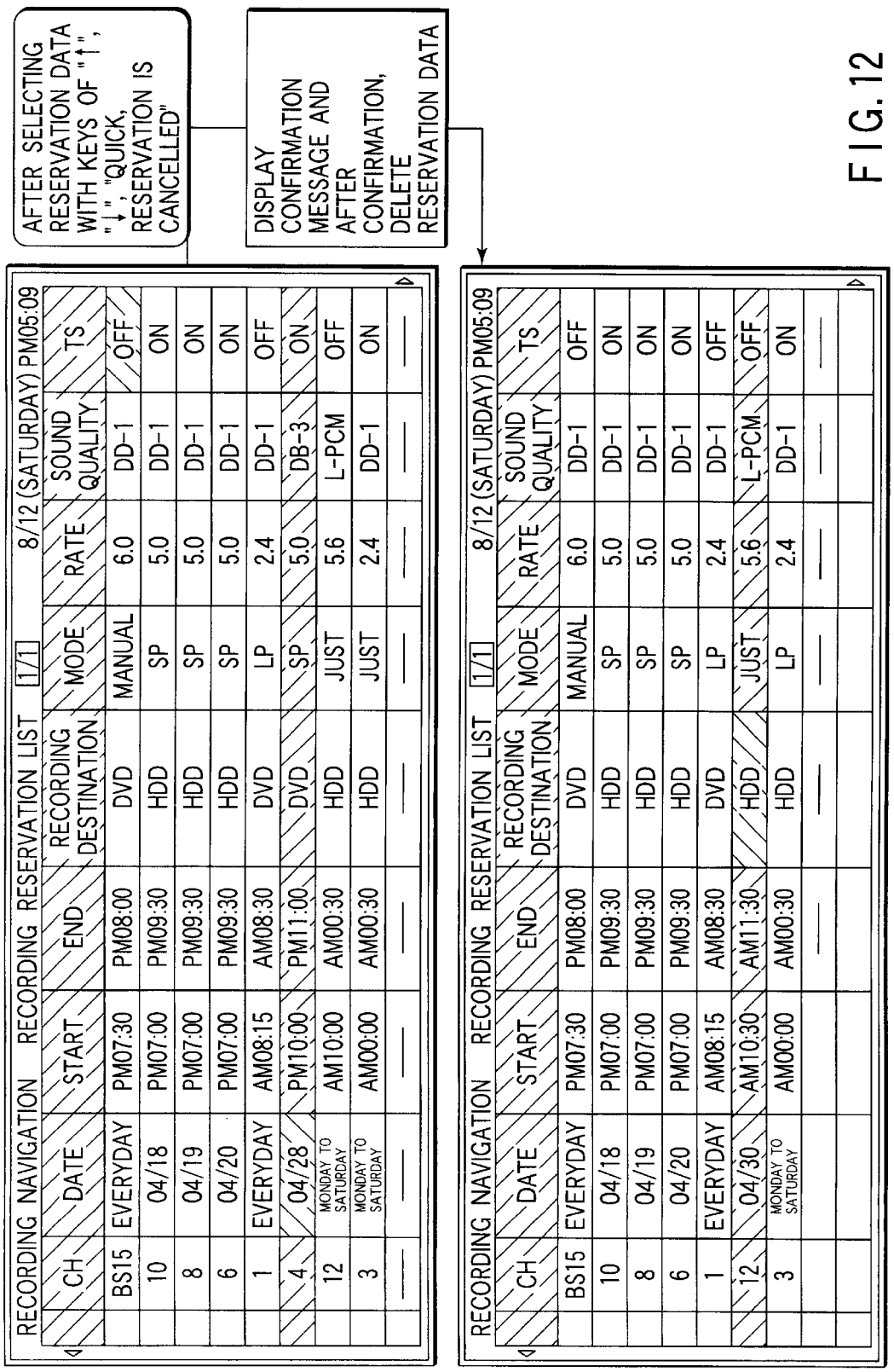
FIG. 12 is a view explaining deletion of reservation of recording.

The recording/reproduction device in association with the DVD generates the operation with respect to the recording/reproduction operation and the operation with respect to the GUI function. As one example, the operation on the GUI screen which is displayed on the screen in association with the GUI function will be described below. FIGS. 8 and 9 depict an example of the GUI screen. FIG. 8 is a view explaining an operation with respect to the GUI screen by a conventional remote controller. FIG. 9 is a view explaining an operation with respect to the GUI screen by the remote controller according to the present invention. As shown in FIGS. 8 and 9, a plurality of frames are displayed on the GUI screen.

At first, the operation on the GUI screen by the conventional remote controller will be described. The conventional remote controller, for example, the remote controller provided with a frame selection key and a execution key is assumed. The frame selection key sequentially selects different frames as a candidate to be selected in association with a pushing operation. The execution key determines the selection candidate which is selected by the frame selection key in association with the pushing operation. The conventional remote controller is sometimes required to operate the keys many times until it reaches an objective frame. For example, in the case that the user wishes to see the GUI screen on a next page under the condition that "list registration" in one frame is selected as a selection candidate, the user presses down the frame selection key four times to select a frame of "a next page" as a selection candidate and then, the user must press down the execution key once. In other words, five times of key operations are needed in total.

In order to solve this problem, according to the remote controller of the present invention, shifting of frames, switching of items in the frames and shifting of pages are accomplished by independent key operations, respectively. In other words, in the state that the GUI mode is being executed, the cursor key 1 controls the frame shifting operation on the GUI screen. Specifically, the cursor key 1 sequentially selects different frames as a selection candidate in association with a declination operation in plural directions (four directions or eight directions). Further, in the state that the GUI mode is being executed, the dial key 2 controls the item selection operation in the frames of the GUI screen. Specifically, the dial key 2 selects the items in the frames as a selection candidate in association with the rotation operation of the concentric circle. For example, when the dial key 2 is rotated clockwise, i.e., right-handed, the remote controller sequentially and downwardly selects the items in the frames as a selection candidate. On the contrary, when the dial key 2 is rotated counterclockwise, i.e., left-handed, the remote controller sequentially and upwardly selects the items in the frames as a selection candidate. Further, in the state that the GUI mode is being executed, the lever key 3 controls the page feeding operation on the GUI screen. Specifically, the lever key 3 shifts the GUI screen to a previous page or a next page in association with a pushing down operation in front and back.

The above described operation is performed while the GUI mode is being executed. Next, the operation, which is performed while the recording/reproduction mode is being executed will be described below. When the lever key 3 is pushed in the recording/reproduction mode, especially, in a normal reproduction state, the screen is temporally suspended. When the dial key 2 is rotated clockwise in this state, the single frame of the screen is stepped. On the contrary, when the dial key 2 is rotated counterclockwise, the single frame of the screen is returned. When the lever key 3 is pushed again in the temporary suspension state, the screen returns to a normal reproduction state.

When the lever key 3 is shifted to the front only once (it is turned over to the upper side only once) in the normal reproduction state, the screen is fast-forwarded. Further, when it is shifted to the front one more time, the speed of fast-forward becomes high. In the state of fast-forward, when the lever key 3 is pushed, the screen returns to a normal reproduction state.

When the lever key 3 is shifted backward only once (it is turned over to the lower side only once) in the normal reproduction state, the screen is quickly returned. Further, when it is shifted backward one more time, the speed of quick return becomes high. When the lever key 3 is pushed in a quick return state, the screen returns to a normal reproduction state.

As described above, when the remote controller of the present invention is used, it is possible to instruct a single frame step, a single frame return, quick forward, high speed quick forward, quick return and high speed quick return or the like without grasping the remote controller again during the operation. Therefore, the remote controller according to the present invention is especially effective in the edition screen of the GUI.

Various operations by the remote controller according to the present invention will be described with reference to the drawings below.

FIG. 10 is a view explaining an operation by a remote controller with respect to a recording reservation GUI screen. As shown in FIG. 10, the cursor key 1 controls focus shifting in a reservation data list in association with the operation to decline the remote controller in plural directions. The dial key 2 controls selection of item values in set items (when it is rotated cyclically, right-handed and left-handed, the item values appear in reverse) in association with rotation operation in a circular arc. The details are as shown in FIG. 10. The lever key 3 controls switching the pages of the reservation list in association with the shifting operation in front and back.

Starting date and time of recording which are set via the recording reservation GUI screen is stored in following places in the RTR_VMG.

"RTR_VMG-M_AVFIT-M_AVFI-M VOBI#1-M_VOB_GI"

Contents of the M_VOB_GI is as follows.

M_VOB_GI-VOB_TY
   VOB_REC_TM
   VOB_REC_TM_SUB
   M_VOB_STIN
   VOB_V_S_PTM
   VOB_V_E_PTM

The above start time of recording is stored in this VOB_REC_TM.

Consequently, with reference to FIGS. 11A to 11C and FIG. 12, creation of the recording reservation, correction and deletion thereof will be described below.

Creation of reservation will be described in (1) to (6).

(1) In a recording reservation list GUI, there are a normal mode, an input mode and an extension mode. When the recording reservation list GUI is activated, it is set in the normal mode. Pushing a cursor key 1, the normal mode is shifted to the input mode on any frames of the list and pushing an "QUICK" key, the normal mode is shifted to the extension mode on any frames of the list, respectively.

(2) In the normal mode, the user is capable of freely shifting in the list in units of frames, including uninputted frames, by focusing frames (a focused frame is highlighted). By using right and left keys, shift between a previous line and a next line becomes possible and by using upper and lower keys, upper and lower shift becomes possible. In the input mode, the current line is locked and highlighted entirely. In this case, only right and left shifts in this line are possible.

(3) In the input mode, inputting and changing the item of each frame on a locked line become possible. The dial key 2 accomplishes the inputting and changing the item of each frame.

(4) Pushing the cursor key 1 in the input mode, the reservation data check is accomplished. Then, if there is no problem, the user registers the reservation. After registration, locking of the line is released and the input mode is shifted to the normal mode.

(5) In the extension mode, the line is locked. After the user shifts the time in units of ten minutes under the condition the "QUICK" key has been pushed, the user registers by pushing the cursor key 1. After registration, locking of the line is released and the extension mode is shifted to the normal mode.

(6) In the case that a "recording navigation" key or other operation to shift to other GUI is called without pushing the cursor key 1 in the input mode, alert that "the reserved recording is cancelled. YES/NO" is provided. Then, if the answer is "YES", the reservation is cancelled and the GUI shifting operation is performed. If the answer is "NO", the list returns to the state before the GUI shifting operation is requested.

FIG. 13 is a view explaining a remote controller operation with respect to an edit GUI.

As shown in FIG. 13, focus shifting between the current position, a split button and a thumbnail list (cyclic focus shifting) is controlled in association with a declination operation in upper and lower directions ("↑", "↓") of the cursor key 1. In associated with a declination operation in right and left directions ("←", "→") of the cursor key 1, the chapter selection by the focus shifting between the displayed thumbnails is controlled. The key of "←" on the left thumbnail displays the previous page and the key of "→" on the right thumbnail displays the next page.

In associated with the rotation operation by the dial key 2, in the case that the split button is focused, the single frame step and the single frame return are controlled when the screen is temporally suspended. By the rotation operation of 22.5 degrees to the left, the single frame return is accomplished and by the rotation operation of 22.5 degrees to the right, the single frame step is accomplished.

In associated with the shifting operation in front and back of the lever key 3, in the case that the split button is focused, fast forward and fast return of the title which is reproduced in the reproduction frame is controlled. In the case that the chapter thumbnails are focused, page switching of the thumbnail list is controlled.

The creation of the recording reservation is explained only with reference to the original assuming that 1 PGC=1 Cell. A head of the chapter which is created in nth number from a head of this Cell, is recorded as described below.

RTR_VMG-ORG_PGCI-CI#1-M_CI-M_C_EPI#N
The M_CI_EPI#N indicates a head of this Cell.
A content of the M_CI_EPI#N is as follows.

M_CI_EPI#N-EP_TY an entry point type
   EP_PTM PTM of an entry point type
   PRM_TXTI text information (in the case of a type A)
In the above EP_PTM, a head PTM of the chapter which is created by the above chapter creation GUI is written.

Figure 14:
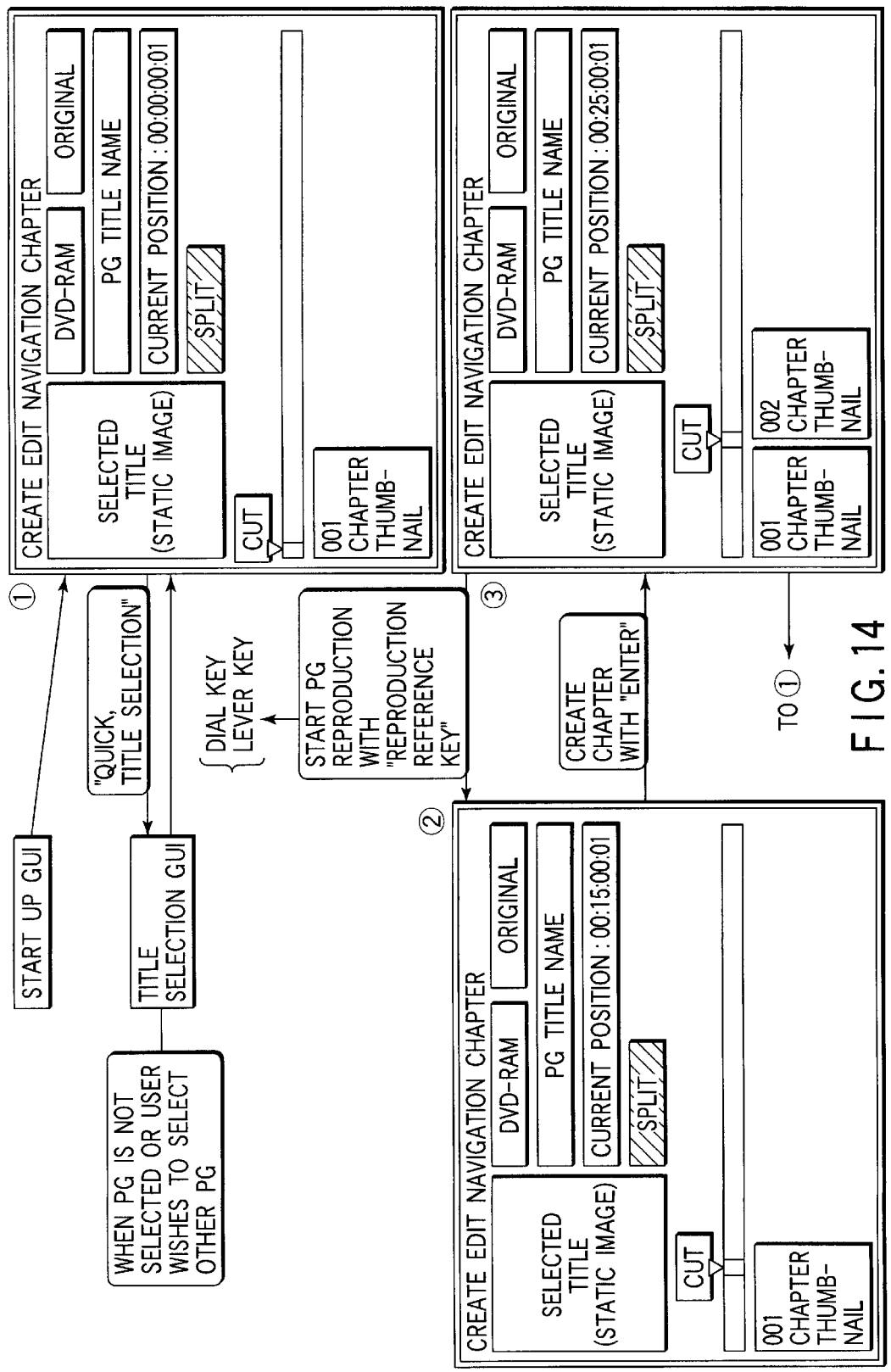
FIG. 14 is a view explaining creation in the chapter creation basic operations.
Figure 15:
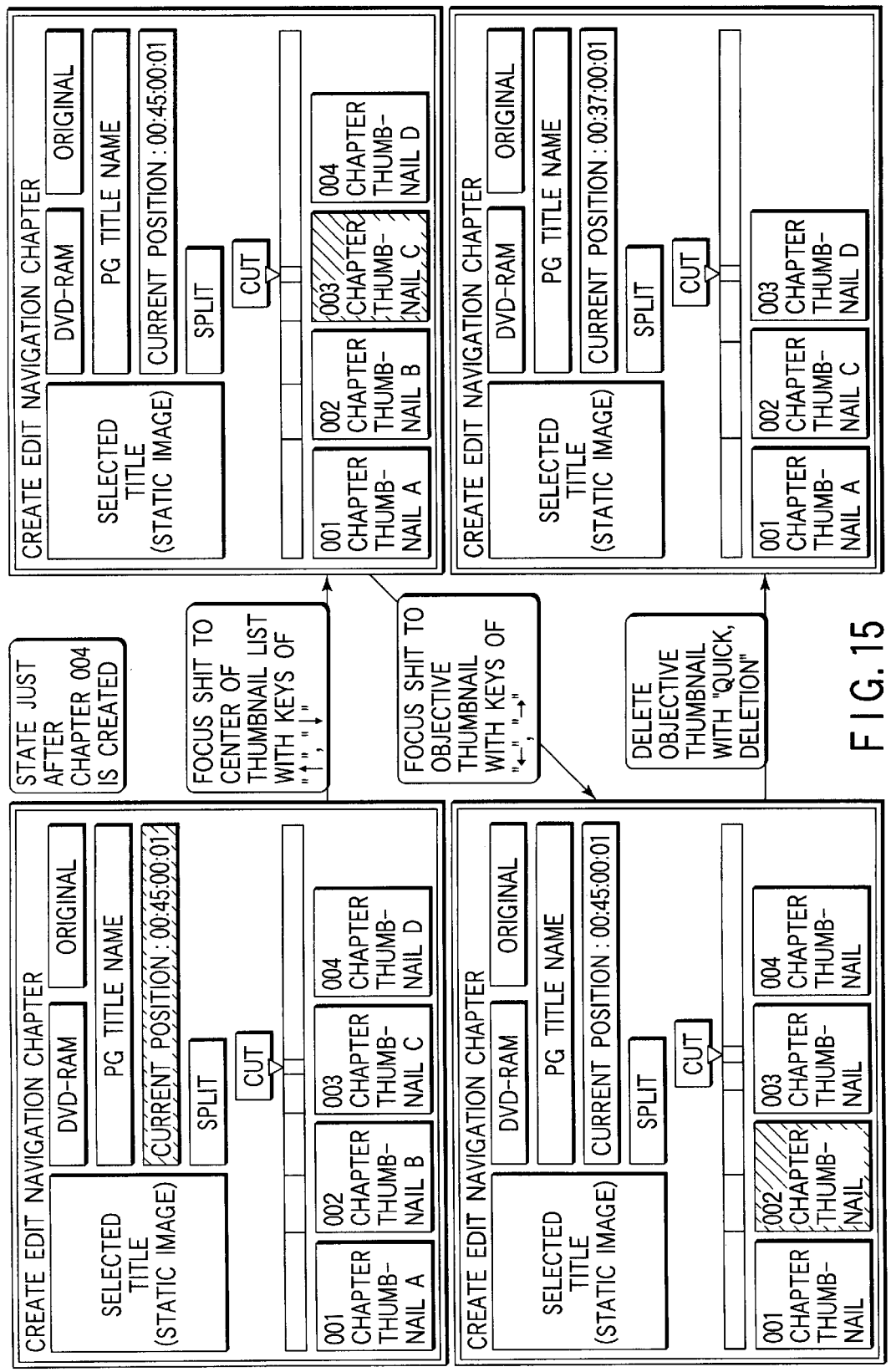
FIG. 15 is a view explaining deletion in the chapter creation basic operations.

FIGS. 14 to 15 show a basic operation in a chapter creation. FIG. 14 shows creation in the chapter creation basic operation and FIG. 15 shows deletion in the chapter creation basic operation.

According to the present invention, it is possible to provide a multi controller having an excellent operability. Particularly, the present invention provides a multi controller having an excellent operability in association with the recording/reproduction device and the GUI function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi controller comprising:
first operating means for generating a control signal in association with a declination operation in plural directions;
second operating means for generating a control signal in association with a rotation operation in a circular arc; and
third operating means for generating a control signal in association with a shifting operation in front and back,
wherein said first and second operation means are concentrically arranged and said third operation means is arranged at specific distance from a center of this concentric circle.

2. A multi controller according to claim 1, wherein the control signal, which is generated by said second operating means, controls reproduction in a reproduction control mode and the control signal, which is generated by said second operating means, controls the operation via a GUI in a GUI mode.

3. A multi controller according to claim 1, wherein, in a GUI mode, the control signal which is generated by said first operating means controls a frame shifting operation on a GUI screen, the control signal which is generated by said second operating means controls an item selection operation in frames on the GUI screen and the control signal which is generated by said third operating means controls a page forwarding operation on the GUI screen.

4. A multi controller according to claim 1, wherein, in a reproduction control mode, the control signal which is generated by said third operating means controls suspension of reproduction in association with a pushing operation in a normal reproduction state, the control signal which is generated by said second operating means controls a single frame step and single frame return in association with a rotation operation in a circular arc in the reproduction suspension state, the control signal which is generated by said third operating means controls reproduction suspension release in association with a pushing operation in the reproduction suspension state and the control signal which is generated by said third operating means controls fast forwarding and fast return in association with a shifting operation in front and back in the normal reproduction state.

5. A multi controller comprising:
first operating means for generating a control signal to control a first function in association with a declination operation in four or eight directions and generating a control signal to control a second function in association with a pushing operation;
second operating means for generating a control signal to control a third function in association with a rotation operation in a circular arc; and
third operating means for generating a control signal to control a fourth function in association with a shifting operation in front and back and generating a control signal to control a fifth function in association with a pushing operation,
wherein said first and second operation means are concentrically arranged and said third operation means is arranged at specific distance from a center of this concentric circle.

6. A multi controller according to claim 5, wherein the control signal which is generated by said second operating means controls reproduction in a reproduction control mode and the control signal which is generated by said second operating means controls the operation via a GUI in a GUI mode.

7. A multi controller according to claim 5, wherein, in a GUI mode, the control signal which is generated by said first operating means controls a frame shifting operation on a GUI screen, the control signal which is generated by said second operating means controls an item selection operation in frames on the GUI screen and the control signal which is generated by said third operating means controls a page forwarding operation on the GUI screen.

8. A multi controller according to claim 5, wherein, in a reproduction control mode, the control signal which is generated by said third operating means controls suspension of reproduction in association with a pushing operation in a normal reproduction state, the control signal which is generated by said second operating means controls a single frame step and single frame return in association with a rotation operation in a circular arc in the reproduction suspension state, the control signal which is generated by said third operating means controls reproduction suspension release in association with a pushing operation in the reproduction suspension state and the control signal which is generated by said third operating means controls fast forwarding and fast return in association with a shifting operation in front and back in the normal reproduction state.

9. A multi controller according to claim 1, wherein said third operating means is a lever key located in a side of the multi controller.

10. A multi controller according to claim 5, wherein said third operating means is a lever key located in a side of the multi controller.

11. A multi controller, comprising:
a first operator generating a first control signal in association with a declination operation in plural directions;
a second operator for generating a second control signal in association with a rotation operation in a circular arc; and
a third operator for generating a third control signal in association with a shifting operation in front and back,
wherein said first and said second operators are concentrically arranged and said third operator is arranged at specific distance from a center of this concentric circle.

12. A multi controller according to claim 11, wherein the second control signal controls reproduction in a reproduction control mode and controls the operation via a GUI in a GUI mode.

13. A multi controller according to claim 11, wherein, in a GUI mode, the first control signal controls a frame shifting operation on a GUI screen, the second control signal controls an item selection operation in frames on the GUI screen and the third control signal controls a page forwarding operation on the GUI screen.

14. A multi controller according to claim 11, wherein, in a reproduction control mode, the third control signal controls suspension of reproduction in association with a pushing operation in a normal reproduction state, the second control signal controls a single frame step and single frame return in association with a rotation operation in a circular arc in the reproduction suspension state, the third control signal controls reproduction suspension release in association with a pushing operation in the reproduction suspension state and the third control signal controls fast forwarding and fast return in association with a shifting operation in front and back in the normal reproduction state.

15. A multi controller, comprising:
a first operation generating a first control signal to control a first function in association with a declination operation in four or eight directions and generating a second control signal to control a second function in association with a pushing operation;
a second operator generating a third control signal to control a third function in association with a rotation operation in a circular arc; and
a third operator generating a fourth control signal to control a fourth function in association with a shifting operation in front and back and generating a fifth control signal to control a fifth function in association with a pushing operation,
wherein said first and second operator are concentrically arranged and said third operator is arranged at specific distance from a center of this concentric circle.

16. A multi controller according to claim 15, wherein the third control signal controls reproduction in a reproduction control mode and controls the operation via a GUI in a GUI mode.

17. A multi controller according to claim 15, wherein, in a GUI mode, the first control signal controls a frame shifting operation on a GUI screen, the third control signal controls an item selection operation in frames on the GUI screen and the fourth control signal controls a page forwarding operation on the GUI screen.

18. A multi controller according to claim 15, wherein, in a reproduction control mode, the fifth control signal controls suspension of reproduction in association with a pushing operation in a normal reproduction state, the third control signal controls a single frame step and single frame return in association with a rotation operation in circular arc in the reproduction suspension state, the fifth control signal controls reproduction suspension release in association with a pushing operation in the reproduction suspension state and the fourth control signal controls fast forwarding and fast return in association with a shifting operation in front and back in the normal reproduction state.

19. A multi controller according to claim 11, wherein said third operator is a lever key located in a side of the multi controller.

20. A multi controller according to claim 15, wherein said third operator is a lever key located in a side of the multi controller.

* * * * *